(12) United States Patent
Xu et al.

(10) Patent No.: US 12,621,256 B2
(45) Date of Patent: May 5, 2026

(54) METHODS, APPARATUSES, DEVICES, MEDIUM AND PRODUCT FOR INFORMATION DISPLAY AND INFORMATION SENDING

(71) Applicant: Beijing Zitiao Network Technology Co., Ltd., Beijing (CN)

(72) Inventors: Qiansong Xu, Beijing (CN); Shijie Liu, Beijing (CN); Yujia Lei, Beijing (CN); Xin Zhong, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/902,693

(22) Filed: Sep. 30, 2024

(65) Prior Publication Data

US 2025/0023837 A1 Jan. 16, 2025

Related U.S. Application Data

(63) Continuation of application No. PCT/CN2023/085604, filed on Mar. 31, 2023.

(30) Foreign Application Priority Data

Mar. 31, 2022 (CN) .......................... 202210345470.6

(51) Int. Cl.
  *H04L 51/07* (2022.01)
  *H04L 51/04* (2022.01)
(52) U.S. Cl.
  CPC .............. *H04L 51/07* (2022.05); *H04L 51/04* (2013.01)
(58) Field of Classification Search
  CPC ....... H04L 51/07; H04L 51/04; H04L 51/046; H04L 51/18; H04L 67/10; H04L 29/08;
  (Continued)

(56) References Cited

U.S. PATENT DOCUMENTS 8,554,861 B2 * 10/2013 Christie ................. H04L 51/04
                                                       709/207
9,294,892 B2 * 3/2016 Gosselin ........... H04M 1/72436
(Continued)

FOREIGN PATENT DOCUMENTS

CN       106254216 A      12/2016
CN       107332921 A      11/2017
(Continued)

OTHER PUBLICATIONS

International Search Report and Written Opinion for PCT/CN2023/085604, mailed on Jun. 20, 2023, 18 pages.
(Continued)

*Primary Examiner* — Sargon N Nano
(74) *Attorney, Agent, or Firm* — Astute IP Law Group

(57) ABSTRACT

Embodiments of the disclosure relate to methods, apparatuses, devices, medium and product for information display and information sending. The method for information display includes: in response to receiving a sent OKR link in a session, obtaining OKR display information corresponding to the OKR link, wherein the OKR display information includes at least one objective information and/or key result information corresponding to the objective information; displaying the OKR display information in a first display area of the session based on a predetermined display rule. According to embodiments of the present disclosure, after receiving the OKR link, the instant messaging client can directly browse the OKR information without opening the OKR system, which improves the speed of the user obtaining information and improves the user experience.

14 Claims, 7 Drawing Sheets

IN RESPONSE TO AN OPERATION TO AN OBJECTIVE AND KEY RESULT OKR INFORMATION, OBTAIN THE OKR LINK — S201

SEND THE OKR LINK TO THE INSTANT MESSAGING CLIENT, SO THAT THE INSTANT MESSAGING CLIENT OBTAINS THE OKR DISPLAY INFORMATION CORRESPONDING TO THE OKR LINK IN RESPONSE TO RECEIVING THE OKR LINK; AND DISPLAYS THE OKR DISPLAY INFORMATION IN A FIRST DISPLAY AREA BASED ON A PREDETERMINED DISPLAY RULE — S202

(58) Field of Classification Search
CPC ..... H04L 9/32; G06F 16/957; G06F 16/9566; G06F 3/048; G06F 3/14; G06F 17/30; G06F 9/44; G06F 21/62
USPC ......................................... 709/201–206, 226
See application file for complete search history.

(56) References Cited

U.S. PATENT DOCUMENTS

| | | | | |
|---|---|---|---|---|
| 10,650,085 | B2 * | 5/2020 | Masterson | G06F 40/134 |
| 10,749,831 | B2 * | 8/2020 | Zhong | H04L 51/08 |
| 2005/0164196 | A1 * | 7/2005 | Dressman | C12Q 1/6886 |
| | | | | 435/6.12 |
| 2007/0192524 | A1 | 8/2007 | Chan et al. | |
| 2009/0030933 | A1 * | 1/2009 | Brezina | H04L 51/42 |
| | | | | 707/999.102 |
| 2011/0054968 | A1 * | 3/2011 | Galaviz | G06Q 10/0635 |
| | | | | 705/7.41 |
| 2013/0151421 | A1 * | 6/2013 | Van Der Ploeg | G06Q 10/06 |
| | | | | 705/301 |
| 2013/0339099 | A1 * | 12/2013 | Aidroos | G06Q 50/01 |
| | | | | 705/7.36 |
| 2016/0196523 | A1 * | 7/2016 | Pieper | G06Q 10/06393 |
| | | | | 705/7.39 |
| 2016/0330150 | A1 * | 11/2016 | Joe | G06F 3/0486 |
| 2017/0109328 | A1 * | 4/2017 | Kim | G06F 3/0482 |
| 2019/0130512 | A1 * | 5/2019 | Kuhn | H04L 67/00 |
| 2019/0363999 | A1 * | 11/2019 | Christie | H04L 51/04 |
| 2020/0019907 | A1 * | 1/2020 | Notani | G06Q 10/063116 |
| 2020/0242647 | A1 * | 7/2020 | Patel | G07F 17/0057 |
| 2020/0265310 | A1 | 8/2020 | Gerald | |
| 2021/0042681 | A1 | 2/2021 | Homem De Mello et al. | |
| 2021/0211938 | A1 | 7/2021 | Shen | |
| 2022/0058548 | A1 * | 2/2022 | Garg | G06Q 10/06313 |
| 2023/0060507 | A1 * | 3/2023 | Wang | G06Q 10/063116 |
| 2023/0161737 | A1 * | 5/2023 | Madisetti | G06F 16/1815 |
| | | | | 707/608 |
| 2024/0095680 | A1 * | 3/2024 | Lee | G06Q 10/1053 |
| 2024/0319853 | A1 * | 9/2024 | Guo | G06F 3/0481 |
| 2024/0345993 | A1 * | 10/2024 | Madisetti | G06F 16/176 |

FOREIGN PATENT DOCUMENTS

| | | |
|---|---|---|
| CN | 108334395 A | 7/2018 |
| CN | 110825988 A | 2/2020 |
| CN | 112817876 A | 5/2021 |
| CN | 112966973 A | 6/2021 |
| CN | 113449989 A | 9/2021 |
| CN | 113595852 A | 11/2021 |
| CN | 113595858 A | 11/2021 |
| CN | 113918845 A | 1/2022 |
| CN | 113988801 A | 1/2022 |
| CN | 114697285 A | 7/2022 |
| JP | 2013131221 A | 7/2013 |
| JP | 2020046733 A | 3/2020 |
| JP | 2021135736 A | 9/2021 |
| JP | 2023002766 A | 1/2023 |

OTHER PUBLICATIONS

International Standard, "Systems and software engineering—Vocabulary", ISO/IEC/IEEE24765, Dec. 15, 2010, 418 pages.
Notification of granting patent right for Chinese Patent Application No. 202210345470.6, mailed Oct. 13, 2023, 14 pages.
Office Action for Chinese Patent Application No. 202210345470.6, mailed May 26, 2023, 15 pages.
Qujing Civil Servant information and Statistics Management System, 2016, 93 pages, with English Translation of Abstract.
Extended European Search Report for European Patent Application No. 23778494.7, mailed on May 12, 2025, 10 pages.
Office Action for Japanese Patent Application No. 2024-558009, mailed on Nov. 25, 2025, 4 pages.

* cited by examiner

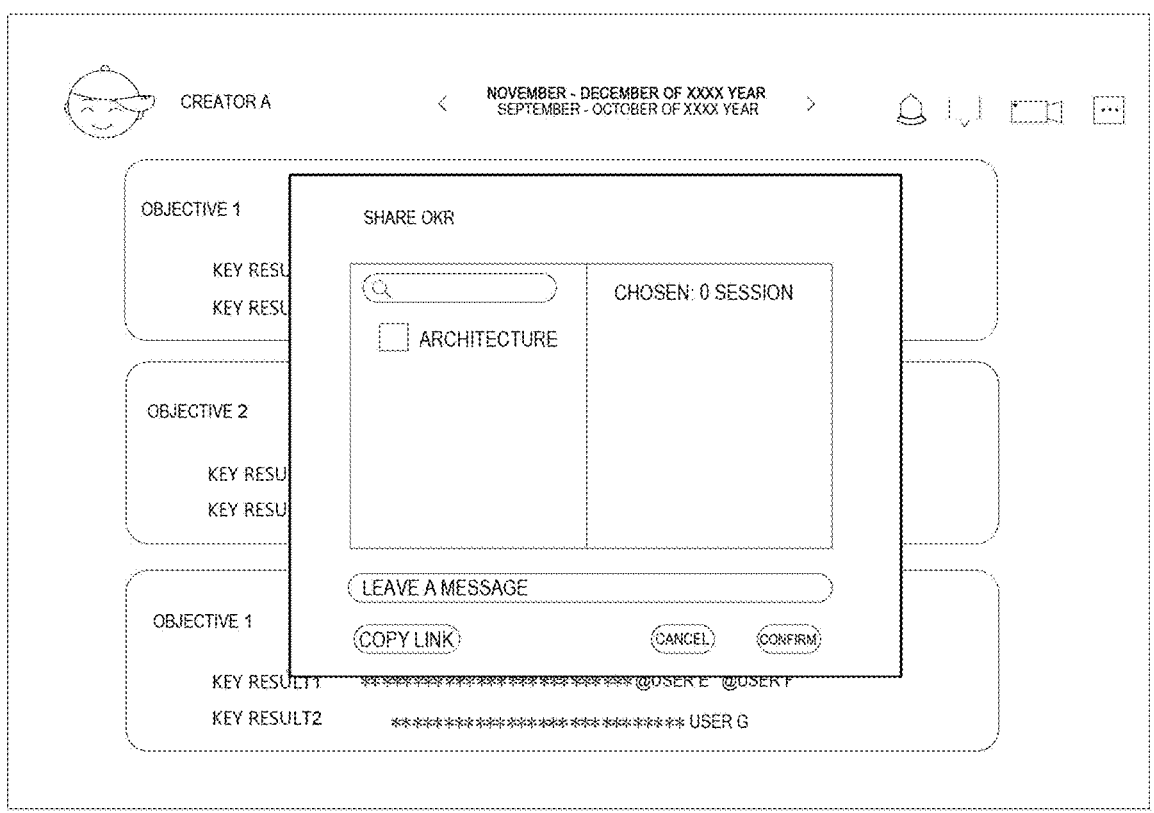

CREATOR A

NOVEMBER – DECEMBER OF XXXX YEAR
SEPTEMBER – OCTOBER OF XXXX YEAR

OBJECTIVE 1

KEY RESL
KEY RESL

OBJECTIVE 2

KEY RESU
KEY RESU

OBJECTIVE 1

KEY RESULT1        *********************@USER E   @USER F
KEY RESULT2        ****************** USER G

SHARE OKR

CHOSEN: 0 SESSION

ARCHITECTURE

LEAVE A MESSAGE

COPY LINK                    CANCEL        CONFIRM

FIG. 8b

CREATOR A

NOVEMBER – DECEMBER OF XXXX YEAR
SEPTEMBER – OCTOBER OF XXXX YEAR

OBJECTIVE 1        ******************USER C   @USER D
    KEY RESULT1        ******************@USER E   @USER F
    KEY RESULT2        ****************** USER G

OBJECTIVE 2        ******************USER C   @USER D
    KEY RESULT1        ******************@USER E   @USER F
    KEY RESULT2        ******************USER G

OBJECTIVE 1        ****************** USER C   @USER D
    KEY RESULT1        ****************** @USER E   @USER F
    KEY RESULT2        ****************** USER G

FIG. 9

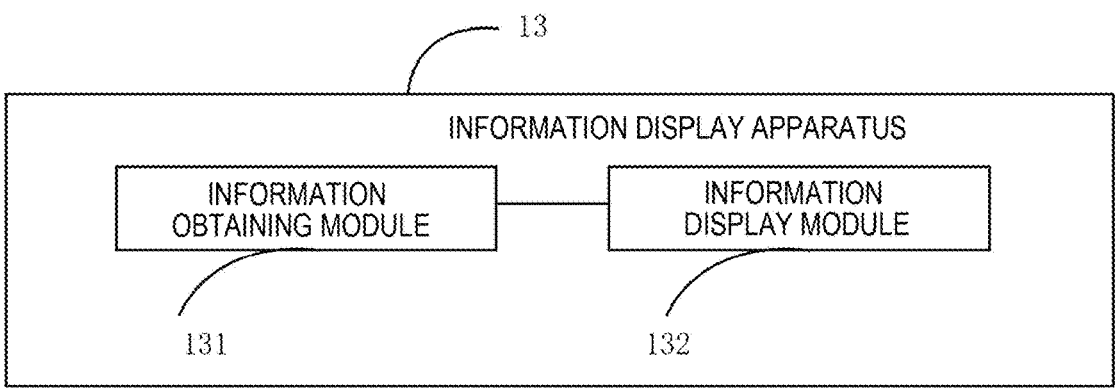
FIG. 13
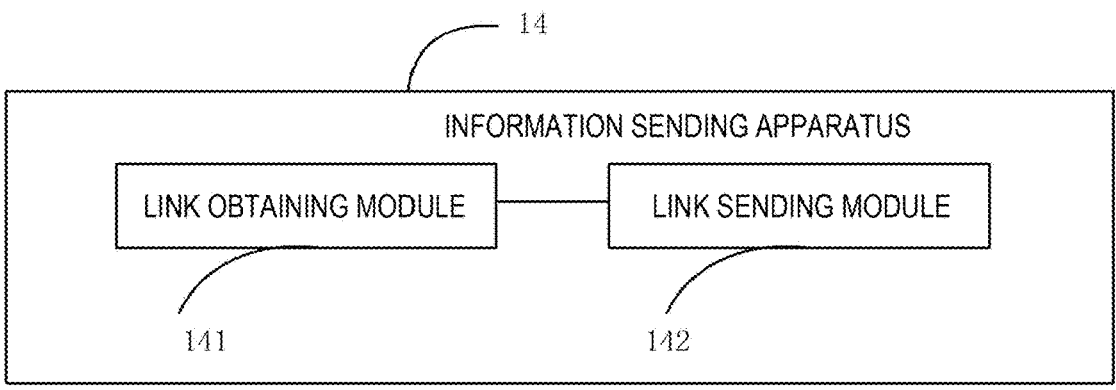
FIG. 14
_1500_
FIG. 15

1

METHODS, APPARATUSES, DEVICES, MEDIUM AND PRODUCT FOR INFORMATION DISPLAY AND INFORMATION SENDING

CROSS REFERENCE

This application is a continuation of International Patent Application No. PCT/CN2023/085604, filed on Mar. 31, 2023, which claims priority to Chinese Patent Application No. 202210345470.6, filed on Mar. 31, 2022 and entitled "METHODS, APPARATUSES, DEVICES, MEDIUM AND PRODUCT FOR INFORMATION DISPLAY AND INFORMATION SENDING", the entirety of which is incorporated herein by reference.

FIELD

The present disclosure relates to the field of the Internet technologies, and in particular, to methods, apparatuses, devices, medium and product for information display and information sending.

BACKGROUND

With the continuous development of Internet technology, it is often necessary to exchange information between a plurality of applications or systems in daily work. For example: interaction between instant messaging client and OKR (Objectives and Key results) system.

During the interaction between the instant messaging client and the OKR system, users are often required to send the OKR information they created to the session of the instant messaging client. However, there is no mature solution on how to display OKR information in the session of the instant messaging client.

SUMMARY

In order to solve the above technical problems or at least partially solve the above technical problems, embodiments of the present disclosure provide methods, apparatuses, devices, medium and product for information display and information sending. After receiving an OKR link, the instant messaging client can directly browse OKR information without opening the OKR system, which improves the speed of users obtaining information and improves user experience.

In a first aspect, embodiments of the present disclosure provide a method for information display method, the method is applied to an instant messaging client and comprises:

in response to receiving a sent OKR link in a session, obtaining OKR display information corresponding to the OKR link, wherein the OKR display information comprises at least one objective information and/or key result information corresponding to the objective information; and displaying the OKR display information in a first display area of the session based on a predetermined display rule.

In a second aspect, embodiments of the present disclosure provide a method for information sending, the method is applied to an OKR system, and the method comprises:

in response to an operation on an objective and key result OKR information, obtaining an OKR link; and

2 sending the OKR link to an instant messaging client, so that the instant messaging client obtains OKR display information corresponding to the OKR link in response to receiving the OKR link, wherein the OKR display information comprises at least one objective information and/or key result information corresponding to the objective information; and displays the OKR display information in the first display area based on a predetermined display rule.

In a third aspect, embodiments of the present disclosure provide an apparatus for information display, the apparatus is configured for an instant messaging client, and the apparatus comprises:

an information obtaining module configured to in response to receiving a sent OKR link in a session, obtaining OKR display information corresponding to the OKR link, wherein the OKR display information comprises at least one objective information and/or key result information corresponding to the objective information; and an information display module configured to displaying the OKR display information in a first display area of the session based on a predetermined display rule.

In a fourth aspect, embodiments of the present disclosure provide an apparatus for information sending device, the apparatus is configured for an OKR system, and the apparatus comprises:

a link obtaining module configured to in response to an operation on an objective and key result OKR information, obtaining an OKR link; and a link sending module configured to sending the OKR link to an instant messaging client, so that the instant messaging client obtains OKR display information corresponding to the OKR link in response to receiving the OKR link, wherein the OKR display information comprises at least one objective information and/or key result information corresponding to the objective information; and displays the OKR display information in the first display area based on a predetermined display.

In a fifth aspect, embodiments of the present disclosure also provide an electronic device, where the electronic device comprises:

one or more processors; and a storage device for storing one or more programs;

when the one or more programs are executed by the one or more processors, causing the one or more processors to implement the method for information display as described in the first aspect or the method for information sending as described in the second aspect.

In a sixth aspect, embodiments of the present disclosure also provide a computer-readable storage medium on which a computer program is stored. When the program is executed by a processor, the method for information display as described in the first aspect or the method for information display as described in the second aspect is implemented.

In a seventh aspect, embodiments of the present disclosure also provide a computer program product. The computer program product comprises a computer program or instructions. When the computer program or instructions are executed by a processor, the method for information display as described in the first aspect or the method for information display as described in the second aspect is implemented.

Embodiments of the disclosure disclose methods, apparatuses, devices, medium and product for information display and information sending. The method for information display comprises: in response to receiving a sent OKR link in a session, obtaining OKR display information corresponding to the OKR link, wherein the OKR display information comprises at least one objective information and/or key result information corresponding to the objective information; and displaying the OKR display information in a first display area of the session based on a predetermined display rule. After receiving an OKR link, the instant messaging client can directly browse OKR information without opening the OKR system, which improves the speed of users obtaining information and improves user experience.

BRIEF DESCRIPTION OF THE DRAWINGS

Through the more detailed description of detailed implementations with reference to the accompanying drawings, the above and other features, advantages and aspects of respective embodiments of the present disclosure will become more apparent. The same or similar reference numerals represent the same or similar elements throughout the figures. It should be understood that the figures are merely schematic, and components and elements are not necessarily drawn scale.

FIG. 8*b* is a schematic diagram of the periodic OKR link sharing manner according to embodiments of this disclosure;

FIG. 9 is a schematic diagram of a single OKR link obtaining according to embodiments of this disclosure;

FIG. 13 is a schematic structural diagram of an apparatus for information display according to embodiments of the present disclosure;

FIG. 14 is a schematic structural diagram of an apparatus for information sending according to embodiments of the present disclosure; and FIG. 15 is a schematic structural diagram of an electronic device in embodiments of the present disclosure.

DETAILED DESCRIPTION

The embodiments of the present disclosure will be described in more detail with reference to the accompanying drawings, in which some embodiments of the present disclosure have been illustrated. However, it should be understood that the present disclosure can be implemented in various manners, and thus should not be construed to be limited to embodiments disclosed herein. On the contrary, those embodiments are provided for the thorough and complete understanding of the present disclosure. It should be understood that the drawings and embodiments of the present disclosure are only used for illustration, rather than limiting the protection scope of the present disclosure.

It should be understood that various steps described in method implementations of the present disclosure may be performed in different order and/or in parallel. Furthermore, method implementations may include additional steps and/or omit steps that are shown. The scope of the present disclosure is not limited in this regard.

The terms "comprise" and its variants used herein are to be read as open terms that mean "include, but is not limited to." The term "based on" is to be read as "based at least in part on." The term "one embodiment" is to be read as "at least one embodiment," the term "another embodiment" is to be read as "at least one another embodiment," and the term "some embodiments" is to be read as "at least some embodiments." Other definitions, explicit and implicit, might be included below.

It should be noted that the concepts of "first," "second" and the like mentioned in the present disclosure are only used to distinguish between different apparatuses, modules or units, rather than limiting the order or interdependence of the functions performed by these apparatuses, modules or units.

It should be noted that modifications "one" and "more" mentioned in the present disclosure are examples but not limiting, and should be understood as "one or more" to those skilled in the art unless otherwise specified.

Names of messages or information exchanged between the plurality of apparatuses in implementations of the present disclosure are used for illustrative purposes only and are not intended to limit the scope of those messages or information.

Figure 1:
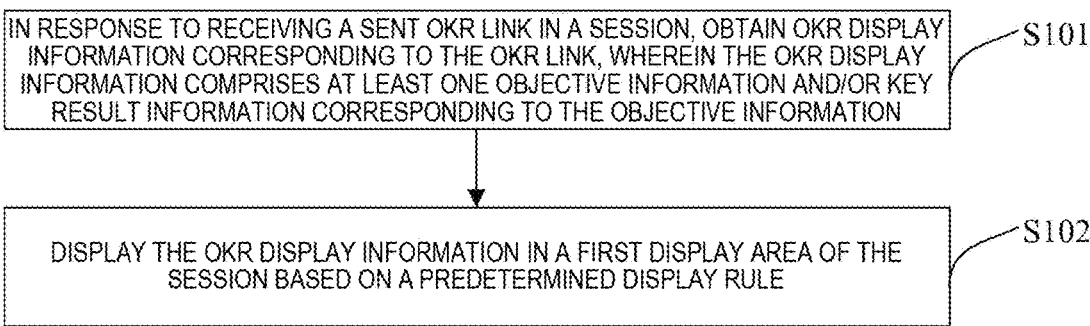
FIG. 1 is a flow chart of a method for information display according to embodiments of the present disclosure.

FIG. 1 is a flow chart of a method for information display according to embodiments of the present disclosure. This embodiment may be suitable for displaying OKR information in an instant messaging client. The method may be executed by an apparatus for information display, and the apparatus may be implemented by software and/or hardware, the apparatus may be configured in electronic devices, such as terminals, including but not limited to smartphones, PDAs, tablets, wearable devices with displays, desktops, laptops, all-in-one computers, and smart home equipment etc. The method is applied to instant messaging clients.

As shown in FIG. 1, the information display method provided by embodiments of the present disclosure mainly includes the following steps:

S101, in response to receiving a sent OKR link in a session, obtaining OKR display information corresponding to the OKR link, wherein the OKR display information comprises at least one objective information and/or key result information corresponding to the objective information.

In one embodiment of this disclosure, the OKR system refers to a set of management tools and methods for defining, tracking objectives and their completion. With the objective management system of the OKR system, the objective information defined by employees at different levels in the enterprise structure may be connected into a network. The OKR system can help each project team to conduct detailed assessment of implementation and performance of project objective and an end of a project objective implementation period. The overall objectives and key results are fully integrated through the OKR system to achieve the strategic objectives set for the enterprise and team within a certain period.

OKR link refers to the address link corresponding to one or more OKR information in the OKR system. Specific OKR information may be parsed through this OKR link. The OKR information at least includes: OKR summary information and/or OKR display information. The OKR Summary information includes: OKR period and OKR creator.

In one of the embodiments of this disclosure, parsing the OKR link may obtain the OKR display information corresponding to the OKR link. OKR display information may be a plurality of objective information within a project period; it may also be at least one key result information corresponding to one objective information. Among them, the objective information may be understood as the project-related objective content set by the OKR creator, and the key result information may be understood as the result information of each key point in the process of completing the objective by the OKR creator.

In one of the embodiments of this disclosure, the sent OKR link may be a copy operation of the OKR system based on the OKR creator, obtaining the OKR link. The user performs the paste operation in the session in the instant messaging client. The instant messaging client responds to the paste operation by pasting the OKR link to the instant messaging client in the session. The sent OKR link may also be the sharing operation of the OKR system based on the OKR creator, Selecting the session specified by in the instant messaging client and sharing the OKR link to the instant messaging client in the session. The sent OKR link may also be the first user performing the copy operation in the session of instant messaging client, obtaining the OKR link and performing the paste operation in the session of the second user, pasting the OKR link into the session in the instant messaging client.

In one embodiment of the present disclosure, the instant messaging client and the OKR system are connected through a communication framework and integrated into a same software system, and the OKR system shares OKR information with the instant messaging client based on the communication framework. The same user may use the same account to log in to the instant messaging client and OKR system.

In an embodiment of the present disclosure, the session may be a single chat session with one instant messaging user, or may be a session group or session group composed of a plurality of instant messaging users. The user corresponding to the session may be the individual user to which the session belongs, or any user in the session group or session group.

S102, displaying the OKR display information in a first display area of the session based on a predetermined display rule.

In one of the embodiments of this disclosure, the first display area may be understood as a session box in the session, where the size of the first display area may be determined according to the specific content of the OKR information.

In one embodiment of the present disclosure, displaying the OKR display information based on the predetermined display rule may be determined based on the specific content included in the OKR display information. Specifically, when the OKR display information includes a plurality of objective information, the plurality of objective information is displayed in the first display area; when the OKR display information includes one objective information and at least one key result information corresponding to the objective information, the objective information and at least one key result information corresponding to the objective information are displayed in the first display area.

In a possible implementation, the method further comprises: displaying card information in the first display area of the session, where the card information includes: OKR summary information and/or OKR display information, where the OKR summary information includes: OKR period and OKR creator. The OKR display information includes at least one objective information and/or key result information corresponding to the objective information.

Figure 2:
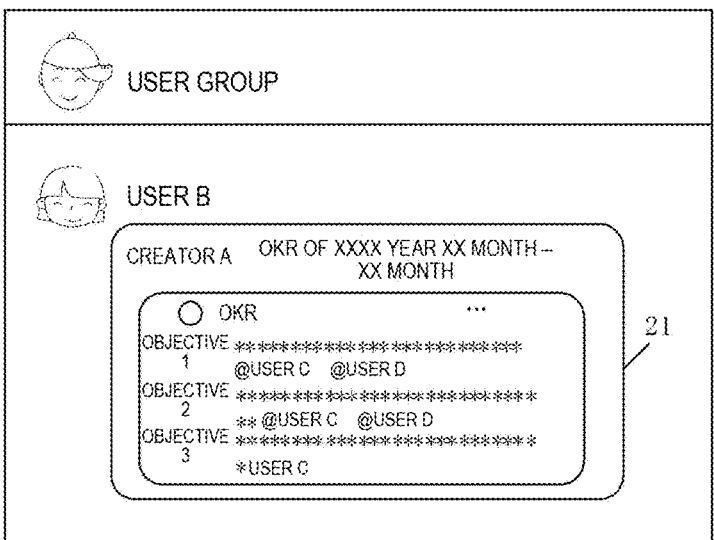
FIG. 2 is a schematic diagram showing all OKR information in a period according to embodiments of this disclosure.

In one of the embodiments of this disclosure, the OKR information obtained by parsing the OKR link is displayed as card information. As shown in FIG. 2, card information is displayed in the session box 21 in a session. The card information includes: OKR summary information and OKR display information. The OKR summary information includes: OKR period, XXXX year XX month-XX month as shown in FIG. 2; OKR creator, creator A as shown in FIG. 2. OKR display information includes a plurality of objective information, objective 1, objective 2 and objective 3 as shown in FIG. 2; or at least one key result information corresponding to the objective.

In this embodiment, the OKR period and OKR creator are displayed as card content, so that users corresponding to the session can intuitively see the summary information of OKR and improve the user experience.

In a possible implementation, if the OKR link is a periodic OKR link, the OKR display information comprises at least one objective information within the period; displaying the OKR display information in the first display area based on the predetermined display rule comprises: displaying at least one objective information within the period in the first display area, the objective information comprising at least one of: an objective serial number, an objective content, and a user link related to the objective content.

In one of the embodiments of this disclosure, periodic OKR links may be understood as links corresponding to all OKR information within a project period. Among them, the periodic OKR link is an address link. Users related to the objective content may be understood as users who are associated with the objective content, such as users who need to view the objective content, users who need to execute the objective content, and so on. The user link related to the objective content may be understood as a link that can open the user information. The user information includes: user avatar, user name, department to which the user belongs, etc. Further, the user corresponding to the session can operate the above-mentioned user link to display the user information of the user related to the objective content.

In an embodiment of the present disclosure, as shown in FIG. 2, only displaying all objective information within a period (XXXX year XX month-XX month as shown in FIG. 2) in the session box. In FIG. 2, this period includes three objective information as an example for illustration. Each objective information includes at least one of: an objective serial number, such as objective 1, objective 2, and objective 3 shown in FIG. 2; an objective content corresponding to each objective serial number, and a user link related to the objective content, such as @userC, @userD as shown in FIG. 2. Among them, it should be noted that each objective information includes at least an objective serial number and an objective content. Whether to include the user link related to the objective content is determined based on whether the user creator created related users for the objective content.

In this embodiment, all objective information within a period is displayed in the session box, so that users corresponding to the session can intuitively see all objective information within a period, which improves the user experience.

In a possible implementation, if the OKR link is a single OKR link, the OKR display information comprises one objective information and/or at least one key result information corresponding to the objective information; displaying the OKR display information in the first display area based on the predetermined display rule comprises: displaying the objective information and/or the at least one key result information corresponding to the objective information in the first display area, the objective information comprising at least one of: an objective serial number, an objective content, and a user link related to the objective content, the key result information comprising at least one of: a key result serial number, a key result content, and a user link related to the key result content.

In one embodiment of this disclosure, a single OKR link may be understood as an address link of any objective information and/or its corresponding key result information within a period. By parsing a single OKR link, an objective information and/or one or more key result information corresponding to the objective information may be obtained.

In one embodiment of this disclosure, the user link related to the key result content may be understood as a link that may open the user information. The user information includes: user avatar, user name, user department, etc., specifically, it may refer to the description of user information in the above embodiments, which will not be described again in this embodiment.

Figure 3:
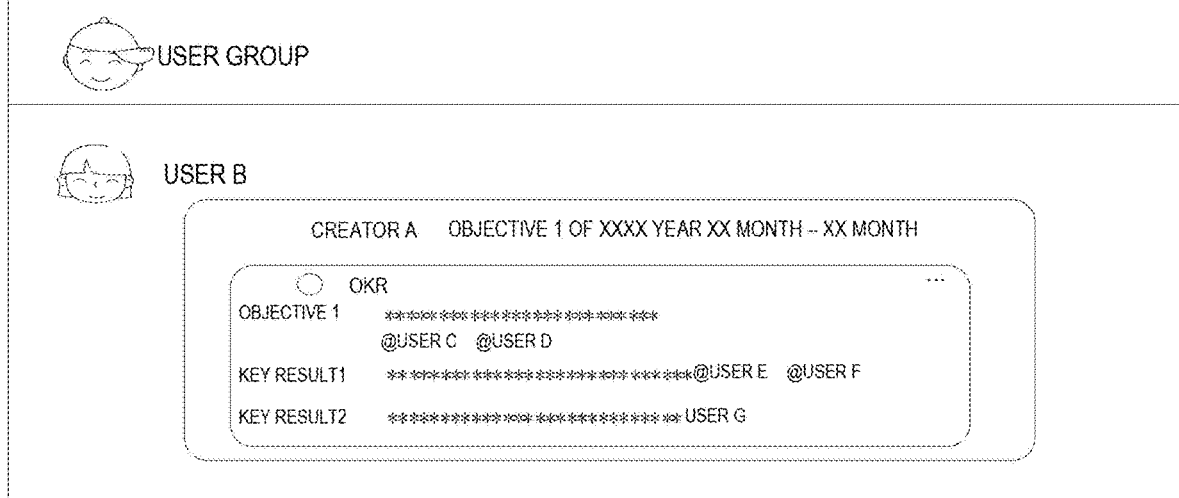
FIG. 3 is a schematic diagram showing any OKR information within a period according to embodiments of this disclosure.

In one of the embodiments of this disclosure, as shown in FIG. 3, OKR summary information is displayed in the session box. The OKR summary information includes the OKR creator, OKR period, and the objective serial number corresponding to the displayed objective information. As shown in FIG. 3, "Creator A's objective 1 for XXXX year XX month-XX month". Further, the session box also includes objective information. The objective information includes: objective serial number, such as objective 1 as shown in FIG. 3; objective content corresponding to the objective serial number, and user links related to the objective content, such as @userC, @userD as shown in FIG. 3. Further, the session box also includes a plurality of key result information corresponding to the objective information. The key result information includes: key result serial numbers, such as key result 1 and key result 2 as shown in FIG. 3; key result serial numbers corresponding to key result content, user links related to key result content, such as @userE, @userF, @userG as shown in FIG. 3.

In this embodiment, one of the objective information in a period is displayed in the session box, so that the user corresponding to the session can intuitively see the objective information and the key result information corresponding to the objective information, which improves the user experience.

Embodiments of the present disclosure disclose a method for information display comprising: in response to receiving a sent OKR link in a session, obtaining OKR display information corresponding to the OKR link, wherein the OKR display information comprises at least one objective information and/or key result information corresponding to the objective information; and displaying the OKR display information in a first display area of the session based on a predetermined display rule. After receiving the OKR link, the instant messaging client in the disclosed embodiments can directly browse the OKR information without opening the OKR system, which improves the speed of the user obtaining information and improves the user experience.

In a possible implementation, the method further comprises: determining whether a user corresponding to the session has the right to view the OKR display information based on the OKR link; in accordance with a determination that the user corresponding to the session does not have the right to view the OKR display information, displaying first prompt information to prompt the user that he does not have the right to view the OKR display information.

In one embodiment of this disclosure, the OKR creator in the OKR system may set viewing rights for OKR display information. Specifically, set a viewing right for all OKR display information within a period; or set corresponding viewing rights for each OKR display information within a period. The viewing rights set in the OKR system may be carried in the OKR link.

In one of the embodiments of this disclosure, the OKR link is parsed, the user with viewing rights set by the OKR creator in the OKR system is obtained, and then whether the user corresponding to the session is a user with viewing rights; is determined. If so, then the OKR display information provided by the above embodiments is displayed. If not, the first prompt information is displayed. The first prompt information is used to prompt the user corresponding to the session that he or she does not have the right to view the OKR display information.

Figure 4:
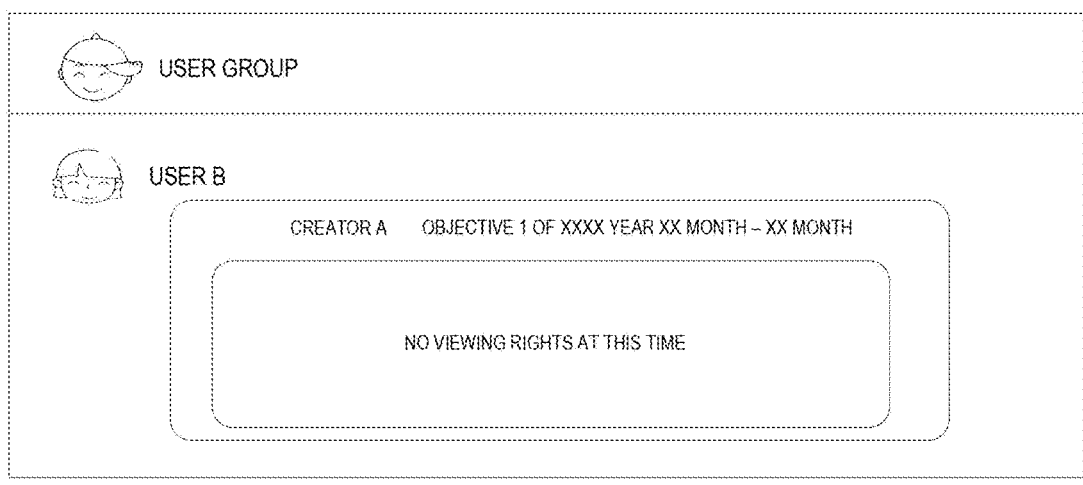
FIG. 4 is a schematic diagram of the prompt information when the user in the embodiments of the present disclosure does not have a viewing right.

In one embodiment of the present disclosure, as shown in FIG. 4, if the user corresponding to the session does not have the right to view the OKR display information, the OKR summary information is still displayed in the session box, and the OKR summary information includes OKR creator, OKR period, and objective serial number corresponding to the displayed objective information. However, the objective information and key result information are no longer displayed in the dialog box. Instead, the prompt message "No viewing right at this time" is displayed in the dialog box, prompting the user that he does not have the right to view OKR display information.

In this embodiment, if the session user does not have the right to view the OKR display information, a prompt box is used to display the right prompt information, which improves the privacy of the OKR display information, and the user can intuitively see that the user does not have the viewing right, which facilitates the user to further inform the user. OKR creators apply for viewing rights to improve the user experience.

In a possible implementation, if the OKR display information includes a plurality of objective information within the period, the method further comprises: in accordance with a determination that the user corresponding to the session has a viewing right for any one of the objective information of in the period, displaying the objective information corresponding to the viewing right.

In an embodiment of this disclosure, if the OKR display information includes a plurality of objective information within a period, different viewing rights may be set for each objective information. Specifically, if user A corresponding to the session has the viewing right for the objective information 1, the objective information 1 is displayed. If user A corresponding to the session does not have the viewing right for the objective information 2, the first prompt message is displayed to remind the user A that the user A does not have the viewing right for the objective information 2 temporarily.

In this embodiment, the viewing rights of the users corresponding to the session are specified for each objective information, which can improve the confidentiality of the information while ensuring the user's viewing rights.

In a possible implementation, if the OKR display information comprises one objective information and at least one key result information corresponding to the objective information, the method further comprises: in accordance with a determination that the user corresponding to the session has the right to view the objective information, displaying the objective information and the key result information corresponding to the objective information; and/or in accordance with a determination that the user corresponding to the session has a viewing right for any of the key result information, displaying the key result information corresponding to the viewing right and the objective information corresponding to the key result information.

In an embodiment of this disclosure, if the OKR display information includes an objective information and/or key result information corresponding to the objective information, the viewing right of the objective information may be set, or different viewing rights may be set for each key result information.

In this embodiment, if the OKR display information includes an objective information and the key result information corresponding to the objective information, if the user corresponding to the session does not have the right to view the objective information, then the objective information and the key results corresponding to the objective information are not displayed, and the first prompt message is displayed to remind the user that the user does not have viewing right temporarily. If the user corresponding to the session has the right to view the objective information, the objective information and the key result information corresponding to the objective information are displayed. The specific display method can refer to the description in the above embodiments, and will not be repeated in this embodiment.

In this embodiment, different viewing rights may be set for each key result information. Specifically, if the user A corresponding to the session has the viewing right for the key result information 1, the key result information 1 and the objective information corresponding to the key result information are displayed. If the user A corresponding to the session does not have the viewing right of the key result information 2, the first prompt information is displayed to remind the user A that the user A does not have the viewing right of the key result information 2 temporarily.

In this embodiment, the viewing rights of the users corresponding to the session are specified for each key result information, which can improve the confidentiality of the information while ensuring the user's viewing rights.

In a possible implementation, the method further comprises: within a first predetermined duration from obtaining the OKR display information for the first time, the viewing right is updated in real time based on a modification of the viewing right by the OKR system; and after the first predetermined duration from obtaining the OKR display information for the first time, the viewing right is delayed updated based on the modification of the viewing right by the OKR system.

In one of the embodiments of this disclosure, the viewing right of OKR display information is modified at any time in the OKR system according to the operation of the OKR creator. Following the OKR creator's modification of the OKR display information viewing rights, the viewing rights of the corresponding user will be updated accordingly.

In an embodiment of this disclosure, the first predetermined duration may be set according to actual needs. Optionally, the first predetermined duration is 3 days.

In one embodiment of this disclosure, within the first predetermined duration of first obtaining the OKR display information, if the OKR creator modifies the viewing right of the OKR display information in the OKR system, the instant messaging terminal updates the viewing right of a user corresponding to the session in real time.

For example, within 3 days from obtaining the OKR display information for the first time, if the OKR creator changes the viewing right corresponding to objective information 1 in the OKR system from User A can view to User A cannot view, the instant messaging terminal will update the User A's viewing right for objective information 1 in real time, which means that user A no longer has the viewing right for objective information 1. At the same time, the first prompt information is displayed in the first display area. For another example, within 3 days from obtaining the OKR display information for the first time, if the OKR creator changes the viewing right corresponding to objective information 1 from User B cannot view it to User B can view it in the OKR system, the instant messaging terminal will update User B's viewing right for objective information 1 in real time, that is, user B has the viewing right for objective information 1, and displays objective information 1 in the first display area. The display method of objective information 1 may refer to the description in the above embodiments, and will not be repeated in this embodiment.

In one embodiment of this disclosure, after the first predetermined time from obtaining the OKR display information for the first time, if the OKR creator modifies the viewing right of the OKR display information in the OKR system, the instant messaging terminal will no longer update the viewing right of the user in real time. Instead, the OKR display information is cached for a period of time. During this period, the user can view the OKR display information normally. After the period of time, the cached OKR display information becomes invalid and the user no longer has the right to view the OKR display information.

For example, 3 days after obtaining the OKR display information for the first time, if the OKR creator changes the viewing right corresponding to objective information 1 in the OKR system from User A can view it to User A cannot view it, the instant messaging terminal will no longer update the User A's viewing right for the objective information in real time. Instead, the instance messaging terminal caches the objective information 1 for 1 day. During the cached day, user A can view objective information 1 normally. After one day, user A does not have the viewing right for objective information 1, and the first prompt information is displayed.

It should be noted that, 3 days after obtaining the OKR display information for the first time, if the OKR creator changes the viewing right corresponding to objective information 1 in the OKR system from user B not being able to view it to user B being able to view it, then the instant messaging terminal User B's viewing right for objective information 1 is updated in real time, that is, user B has the viewing right for objective information 1 and displays objective information 1 in the first display area. The display method of objective information 1 may refer to the description in the above embodiments, and will not be repeated in this embodiment.

In this embodiment, if the OKR creator in the OKR system modifies the viewing rights, the instant messaging client sets different right update methods, which can ensure the user's viewing rights while improving the confidentiality of the information.

In a possible implementation, the method for information display further comprises: in response to an operation on the first display area, jumping to an OKR page of an OKR system to display the OKR display information in a first manner on the OKR page.

In one embodiment of the present disclosure, the operation on the first display area may include a click or touch operation on any position in the first display area, for example, it may be an operation on the OKR display information in the first display area, or OKR summary information in the first display area can be operated.

In one embodiment of the present disclosure, the OKR page link nested in the first display area is obtained and parsed in response to the operation of the first display area, and the terminal interface is controlled to jump to the OKR system. OKR page, and display OKR display information on the OKR page.

In this embodiment, by operating the first display area, the OKR page of the OKR system can be accessed, which provides convenience for users corresponding to the session to enter the OKR system and improves the user experience.

In one embodiment of the present disclosure, displaying the OKR display information in the first manner on the OKR page comprises: displaying one of the objective information and at least one key result information corresponding to the objective information in the OKR page in an objective display manner, the objective display manner referring to being different from a display manner of other objective information and at least one key result corresponding to the objective information.

In one embodiment of this disclosure, the OKR page displays the OKR creator, a plurality of OKR periods, a plurality of objective information included in one OKR period, and a plurality of key result information corresponding to respective objective information.

In one of the embodiments of this disclosure, the objective display manner is to highlight the selected single OKR display information. For example, the objective display manner may be a combination of one or more of: adding shading, highlighting, bolding the font, changing the font, bolding border, etc. Among them, the selected single OKR display information may be the OKR display information sent by the creator to the instant messaging client, or it may be the first OKR display information in the OKR period. The first OKR display information may be the most recently created OKR display information, or it may be the latest updated OKR display information.

Figure 5:
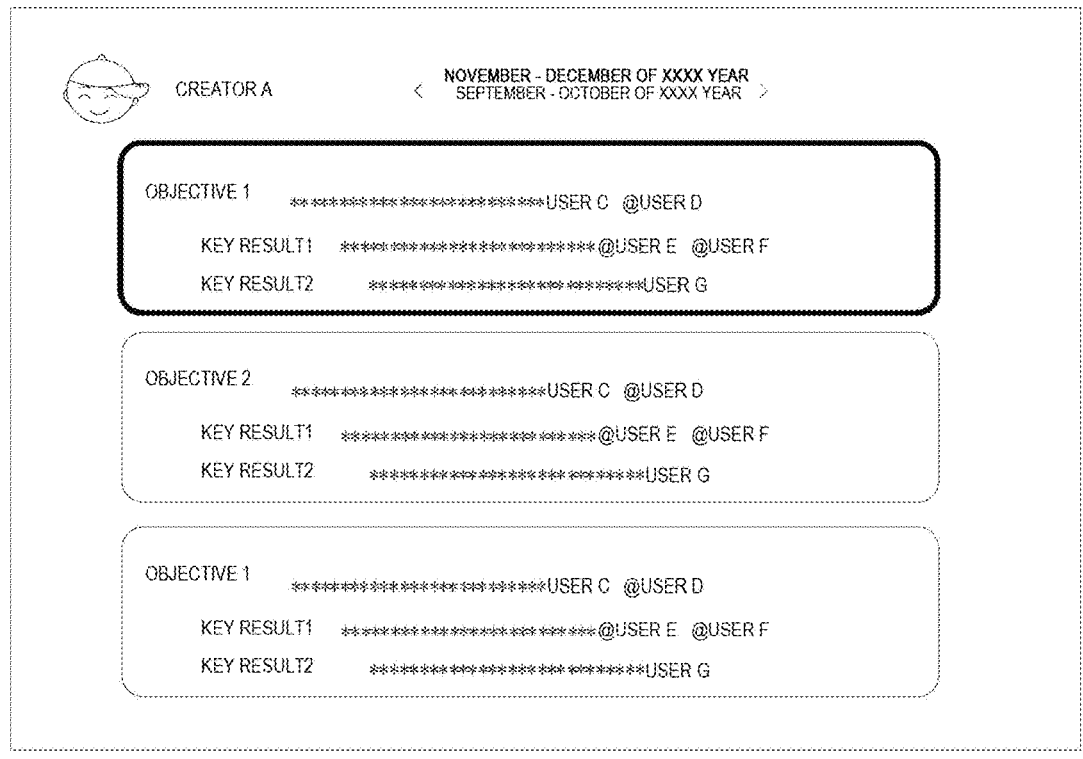
FIG. 5 is a schematic diagram of the OKR page in the OKR system according to embodiments of the present disclosure.

As shown in FIG. 5, the OKR page includes the OKR creator, creator A as shown in FIG. 5; a plurality of OKR periods, such as September-October of XXXX and November-December of XXXX as shown in FIG. 5. The selected period is displayed in bold, such as November-December of XXXX as shown in FIG. 5, to remind the user of the OKR period corresponding to the OKR display information on the OKR page. The first OKR display information in the OKR period is highlighted, and the border of the first OKR display information as shown in FIG. 5 is displayed in bold.

In this embodiment, the OKR display information within the selected period is highlighted so that users can intuitively see the selected OKR display information and improve the user experience.

In a possible implementation, the method further comprises: in accordance with a determination that an OKR creator corresponding to the OKR link does not belong to a same organizational structure as a user in the session, displaying the OKR link in the session.

In one embodiment of this disclosure, the same organizational structure may be understood as an internal personnel management structure built by an enterprise.

In this embodiment, if the OKR creator and the user corresponding to the session are not users of the same enterprise, only the OKR link will be displayed in the session and the OKR display information will no longer be displayed. In this way, the privacy of the OKR display information can be guaranteed.

Figure 6:
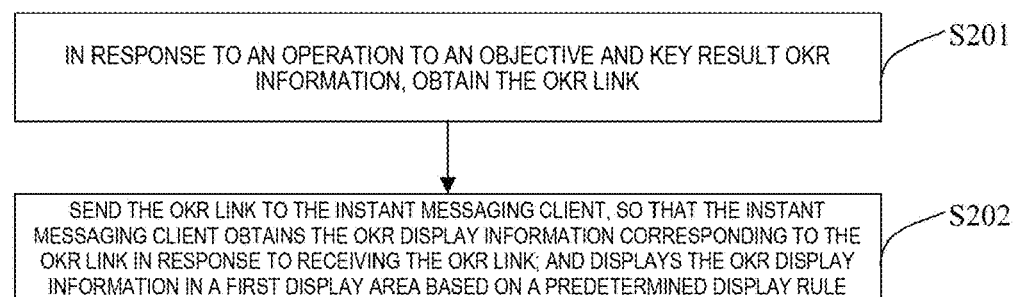
FIG. 6 is a flow chart of a method for information sending according to embodiments of the present disclosure.

FIG. 6 is a flow chart of a method for information sending in accordance with embodiments of the present disclosure. This embodiment may be applied to the situation of sending OKR information to an instant messaging client in an OKR system. This method may be executed by an apparatus for information sending, and the apparatus may be implemented in the form of software and/or hardware. The apparatus may be configured in an electronic device, such as terminals, including but not limited to smartphones, PDAs, tablets, wearable devices with displays, desktops, laptops, all-in-one computers machines, smart home devices, etc. The information sending is used in the OKR system.

As shown in FIG. 6, the method for information sending provided by embodiments of the present disclosure mainly includes the following steps:

S201, in response to an operation on an objective and key result OKR information, obtaining an OKR link.

In one embodiment of this disclosure, the OKR information may be periodic OKR information or single OKR information. Operations on OKR information include copying or sharing operations on OKR information.

In a possible implementation, in response to operating on the OKR information, obtaining OKR links comprises: in response to a copy operation on a uniform resource locator url of a periodic OKR link, obtaining the periodic OKR link.

Figure 7:
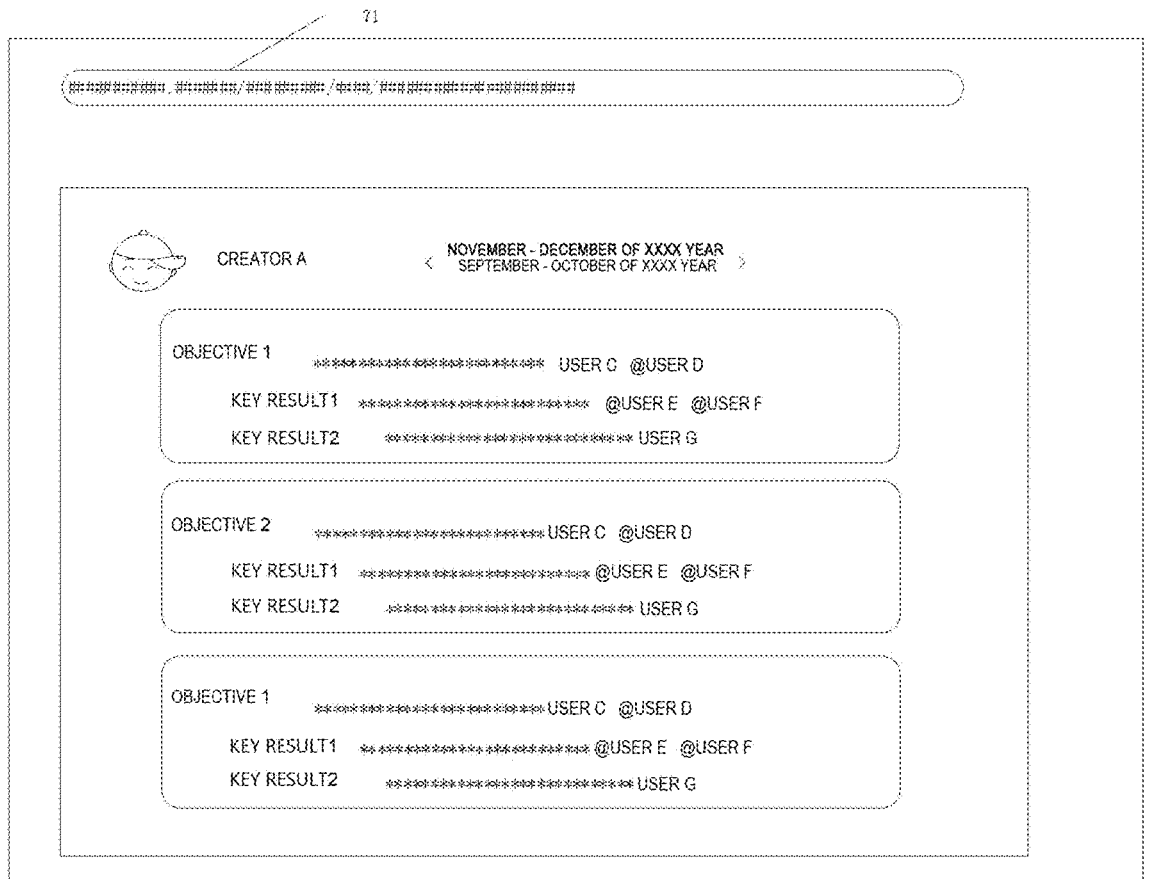
FIG. 7 is a schematic diagram of a periodic OKR link obtaining according to embodiments of this disclosure.

In one embodiment of this disclosure, the copying operation of the url of the periodic OKR information may be understood as a copying operation of the url of the browser address bar when the OKR page of the OKR system displays the OKR information within a period. The above-mentioned copy operation may be performed by selecting the URL in the browser address bar and using shortcut keys to copy, or by using the mouse to click the copy button in the operation bar to copy. This embodiment only briefly explains the copy operation, but does not limit it. As shown in FIG. 7, a copy operation is performed on the url in the browser address bar 71.

In this embodiment, by copying the URL in the browser address bar, the OKR information within a period can be obtained, which facilitates the creator to copy the OKR information within the period and provides users with a better user experience.

In a possible implementation, in response to operating on the OKR information, obtaining an OKR link comprises: in response to an operation of a sharing button for all OKR information in a period, displaying an information receiving user in a second display area; and in response to an operation on the information receiving user, obtaining a periodic OKR link.

Figure 8A:
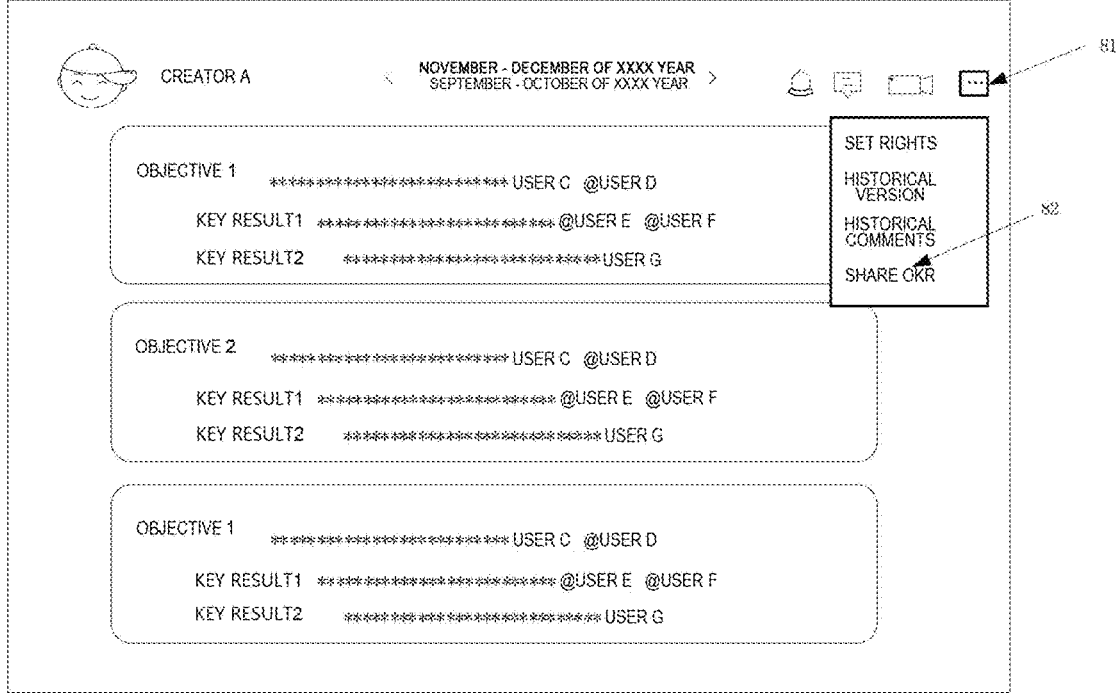
FIG. 8*a* is a schematic diagram of the periodic OKR link sharing button according to embodiments of this disclosure.

In one embodiment of the present disclosure, as shown in FIG. 8a, in response to the operation of the fold button 81 in the OKR page, a subordinate list is displayed in the OKR page, wherein the subordinate list includes right settings, historical versions, historical comments and sharing OKR four subordinate operations. In response to the operation of the share OKR button 82, the second display area is displayed in the form of a floating box on the OKR page.

In one of the embodiments of this disclosure, as shown in FIG. 8b, the second display area, the OKR sharing area, mainly includes two parts of content. The first part includes the search box and the various organizational structures to which the creator belongs. In the search box, it may directly search for users who want to receive OKR information, or select users who want to receive OKR information in the organizational structure. After selecting the users, the selected users will be displayed in the second part. In response to the user's operation on the confirmation button below, the periodic OKR link is obtained and sent to the selected user's instant messaging client. In response to the user's operation of the cancel button below, the sharing operation is canceled.

In this embodiment, by sharing the periodic OKR link, the OKR link is sent to the selected user, which avoids the creator from opening the instant messaging client to perform a paste operation, and improves the efficiency of information sharing.

In a possible implementation, in response to operating on the OKR information, obtaining an OKR link comprises: in response to an operation of a sharing button for all OKR information in a period, displaying a periodic OKR copy button in a second display area; and in response to an operation on the periodic OKR copy button, obtaining the periodic OKR link.

In one of the embodiments of this disclosure, in response to the sharing button operation of all OKR information in the period, please refer to the description in the above embodiments for details, which will not be described again in this embodiment.

In one embodiment of the present disclosure, as shown in FIG. 8b, a button to copy the link is displayed in the second display area, that is, the OKR sharing area. In response to the button to copy the link, the periodic OKR link is obtained, that is, the periodic OKR link is temporarily stored on the pasteboard, the instant messaging client is opened, and the periodic OKR link on the pasteboard is pasted into the session.

In this embodiment, by copying the OKR link through the copy button, obtaining the periodic OKR link realizes the copying of the OKR link, which is convenient for users to send to designated users.

In a possible implementation, in response to operating on the OKR information, obtaining an OKR link comprises: obtaining a single OKR link in response to a copy operation on single OKR information.

In one embodiment of this disclosure, a single OKR information refers to an objective information and its corresponding key result information.

In this embodiment, a manner to copy a single OKR link is provided to realize the copying of a single OKR information, making it convenient to send only one OKR information.

In a possible implementation, in response to the operation on OKR information, obtaining the OKR link comprises: in response to the operation on the single OKR information, displaying a single OKR copy button in the third display area; and obtaining a single OKR link in response to a copy operation on single OKR information.

In one of the embodiments of this disclosure, as shown in FIG. 9, one of the OKR information in the period is selected as a single OKR information, and a copy link button is displayed in the single OKR information display box. In response to the operation of the copy link button, the link of the single OKR information may be copied, that is, the single OKR link is temporarily stored on the pasteboard, the instant messaging client is opened, and the single OKR link on the pasteboard is pasted into the session.

In one of the embodiments of this disclosure, by copying the OKR link through the copy button, obtaining a single OKR link realizes the copying of a single OKR information, making it convenient to send only one OKR information.

In a possible implementation, the method further comprises: in response to the operation on the single OKR modification button, modifying the single OKR information.

Figure 10:
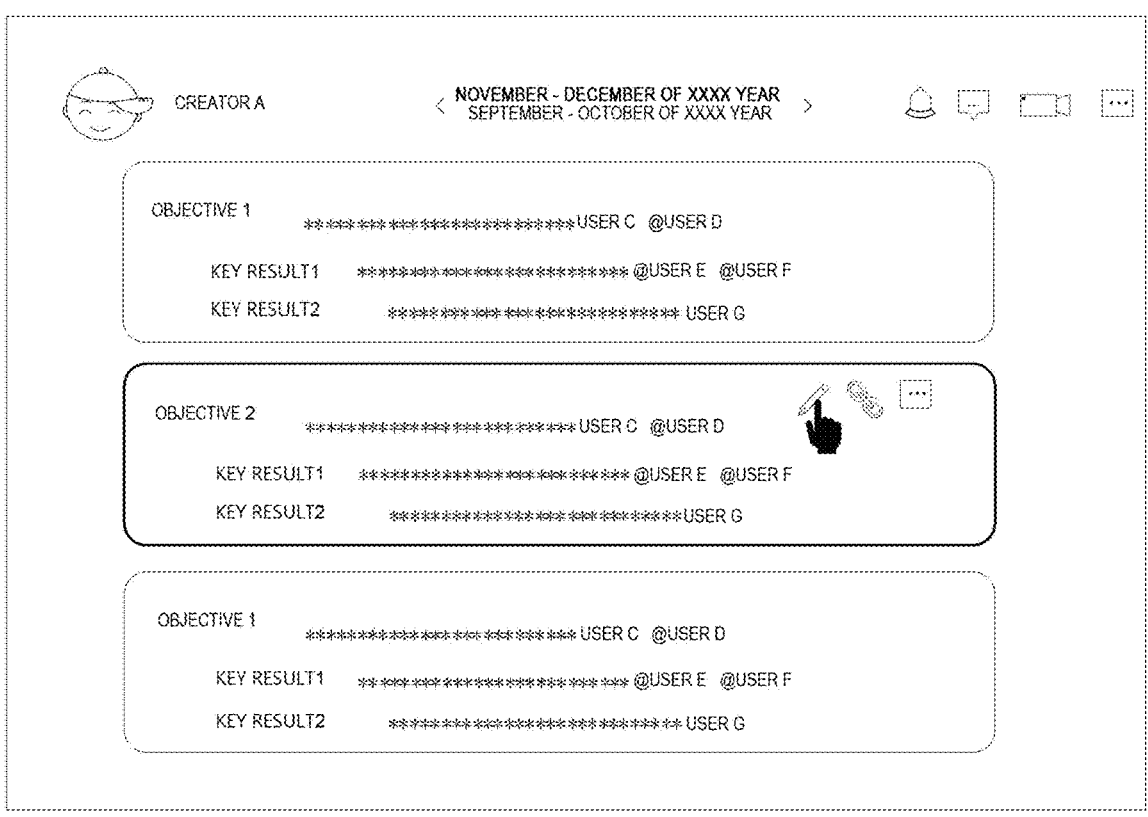
FIG. 10 is a schematic diagram of a single OKR modification operation according to embodiments of this disclosure.

In one of the embodiments of this disclosure, as shown in FIG. 10, one of the OKR information in the period is selected as a single OKR information, and a modification OKR button is displayed in the single OKR information display box. In response to operating the modification OKR button, the OKR content may be modified.

In this embodiment, by operating the modification button, the OKR information can be modified to improve the user experience.

In a possible implementation, the method further comprises: in response to the operation on the single OKR information, displaying a right setting button in a third display area; in response to an operation on the right setting button, displaying a respective right operation button corresponding to each OKR information in a fourth display area, each OKR information comprising: periodic OKR information, objective information in a single OKR information, key result information in single OKR information; and in response to an operation on the right operation button, modifying a viewing right of the OKR information corresponding to the right operation button.

Figure 11A:
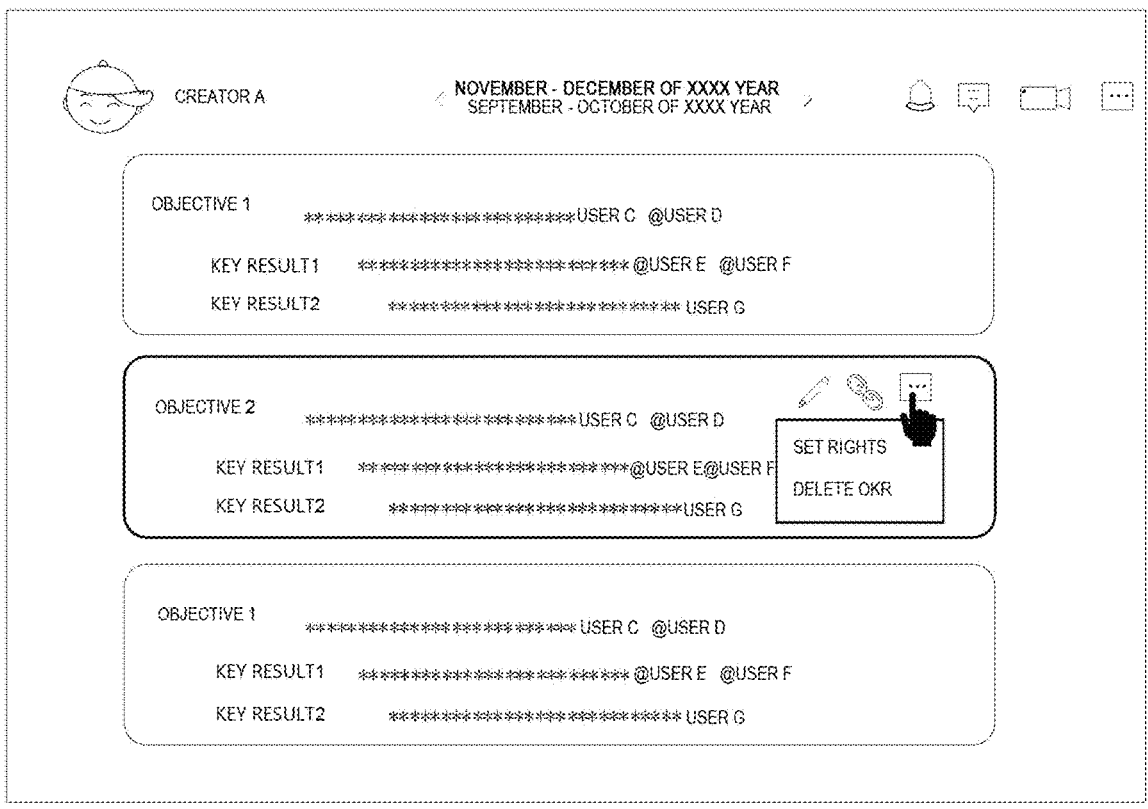
FIG. 11*a* is a schematic diagram of OKR right setting operations according to embodiments of the present disclosure.

In one embodiment of the present disclosure, as shown in FIG. 11a, in response to the operation of the collapse button in a single OKR information, a subordinate list is displayed in the OKR page, wherein the subordinate list includes two lower-level operations, right setting and deletion OKR.

Figure 11B:
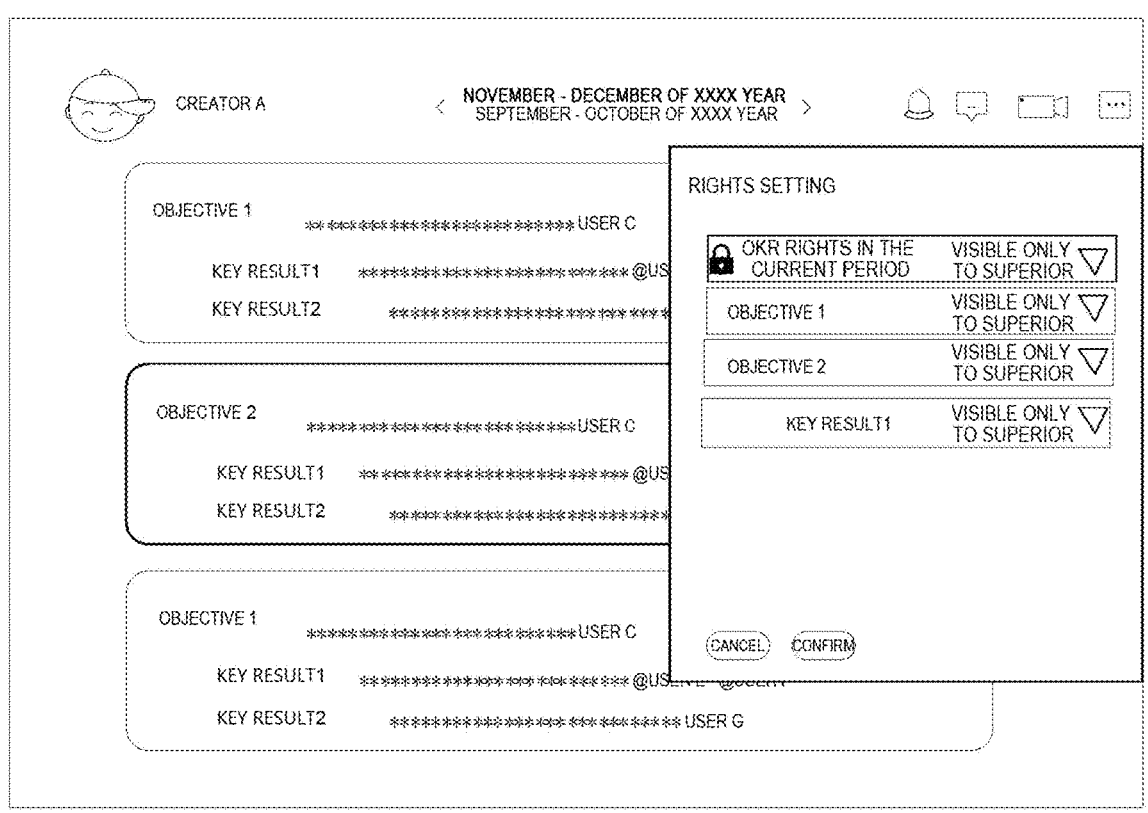
FIG. 11*b* is a schematic diagram of OKR right setting operations according to embodiments of this disclosure.

In one embodiment of the present disclosure, in response to the operation of the right setting button, the right operation button corresponding to each OKR information is displayed in the fourth display area. As shown in FIG. 11b, the right operation buttons include: the right operation button corresponding to the OKR information of this period, the right operation button corresponding to objective 1, the right operation button corresponding to objective 2, the right operation button corresponding to key result 1 corresponding to objective 2, According to the operation of the above right operation button, the viewing right of each OKR information may be set.

It should be noted that after the OKR system modifies the viewing rights for OKR information, the instant messaging client updates the viewing rights for OKR display information according to the predetermined setting. For details, please refer to the description in the above embodiments, which is no longer limited in this embodiment.

In this embodiment, a manner for setting OKR information viewing rights is provided, allowing users to quickly modify the OKR information viewing rights at any time.

In a possible implementation, the method further comprises: in response to an operation on single OKR information, displaying an OKR delete button in s third display area; and in response to operating on the OKR delete button, deleting the single OKR information.

In one embodiment of the present disclosure, as shown in FIG. 11a, in response to the operation of the fold button in a single OKR information, a subordinate list is displayed in the OKR page, wherein the subordinate list includes two lower-level operations, right setting and deletion. In response to the operation of the OKR delete button, the selected OKR information is deleted.

Figure 12:
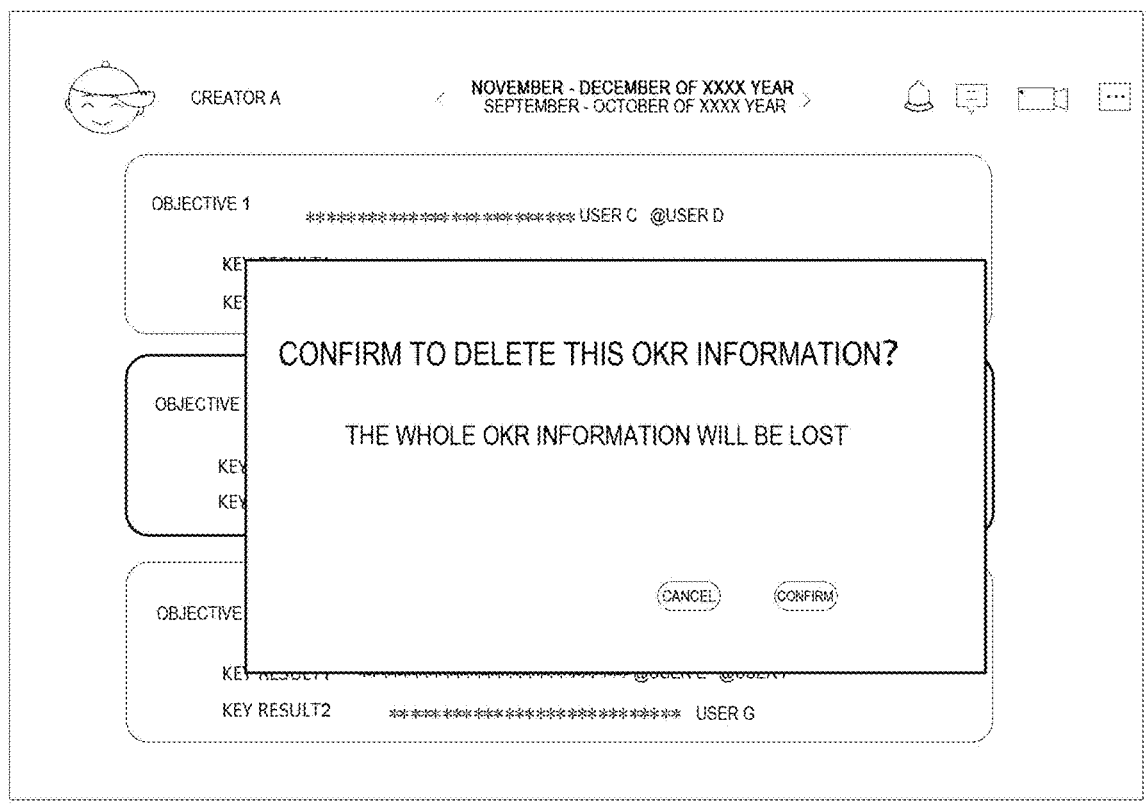
FIG. 12 is a schematic diagram of the OKR deletion operation according to embodiments of this disclosure.

In one embodiment of the present disclosure, as shown in FIG. 12, in response to the operation of the OKR delete button, second prompt information is displayed in the fifth display area, and the second prompt information is used to prompt the user whether to confirm the deletion. This OKR information and prompts that all this OKR information will be lost after deletion. In response to the operation of the confirmation button in the fifth display area, the OKR information is deleted, and in response to the operation of the cancel button in the fifth display area, the deletion operation of this OKR information is canceled.

In this embodiment, a manner for deleting OKR information is provided to facilitate users to delete OKR information at any time.

S202, sending the OKR link to an instant messaging client, so that the instant messaging client obtains OKR display information corresponding to the OKR link in response to receiving the OKR link, wherein the OKR display information comprises at least one objective information and/or key result information corresponding to the objective information; displaying the OKR display information in the first display area based on a predetermined display rule.

Embodiments of this disclosure disclose a method for information sending, which comprises: in response to an operation on an objective and key result OKR information, obtaining an OKR link; and sending the OKR link to an instant messaging client, so that the instant messaging client obtains OKR display information corresponding to the OKR link in response to receiving the OKR link, wherein the OKR display information comprises at least one objective information and/or key result information corresponding to the objective information; displaying the OKR display information in the first display area based on a predetermined display rule. In embodiments of this disclosure, the OKR link is sent to the instant messaging client by copying, pasting or sharing in the OKR system. After receiving the OKR link, the instant messaging client can directly browse the OKR information without opening the OKR system, which improves user obtaining. The speed of information improves user experience.

FIG. 13 is a schematic structural diagram of an apparatus for information display in accordance with embodiments of the present disclosure. This embodiment may be suitable for displaying OKR information in an instant messaging client. The apparatus may be implemented in the form of software and/or hardware. The apparatus may be configured in an electronic device, such as terminals, specifically including but not limited to smartphones, PDAs, tablets, wearable devices with displays, desktops, laptops, all-in-one computers, smart home devices, etc. Herein, the apparatus is configured in an instant messaging client installed in the electronic device.

As shown in FIG. 13, the information display apparatus provided by embodiments of the present disclosure mainly includes an information obtaining module 131 and an information display module 132.

Among them, the information obtaining module 131 is used to obtain the OKR display information corresponding to the OKR link in response to receiving the sent objective and key results OKR link in the session, wherein the OKR display information includes at least one objective information and/or key result information corresponding to the objective information.

The information display module 132 is configured to display the OKR display information in a first display area of the session based on a predetermined display rule.

In a possible implementation, the apparatus further includes: an information display module 132, further configured to display card information in the first display area of the session, the card information comprising: OKR summary information and/or OKR display information, the OKR summary information comprising: an OKR period and an OKR creator.

In a possible implementation, if the OKR link is a periodic OKR link, the OKR display information comprises at least one objective information within the period; the information display module 132 is specifically used to display at least one objective information within the period in the first display area, the objective information comprising at least one of: an objective serial number, an objective content, and a user link related to the objective content.

In a possible implementation, if the OKR link is a single OKR link, the OKR display information comprises one objective information and/or at least one key result information corresponding to the objective information; the information display module 132 is specifically used to display the objective information and/or the at least one key result information corresponding to the objective information in the first display area, the objective information comprising at least one of: an objective serial number, an objective content, and a user link related to the objective content, the key result information comprising at least one of: a key result serial number, a key result content, and a user link related to the key result content.

In a possible implementation, the apparatus further includes: a viewing right determination module, configured to determine whether a user corresponding to the session has the right to view the OKR display information based on the OKR link; a first prompt information display module, configured to in accordance with a determination that the user corresponding to the session does not have the right to view the OKR display information, display first prompt information to prompt the user that he does not have the right to view the OKR display information.

In one possible implementation, if the OKR display information comprises a plurality of objective information within the period, the information display module 132 is specifically used to in accordance with a determination that the user corresponding to the session has a viewing right for any one of the objective information of in the period, display the objective information corresponding to the viewing right.

In a possible implementation, if the OKR display information comprises one objective information and at least one key result information corresponding to the objective information, the information display module 132 is specifically configured to in accordance with a determination that the user corresponding to the session has the right to view the objective information, display the objective information and the key result information corresponding to the objective information; and/or in accordance with a determination that the user corresponding to the session has a viewing right for any of the key result information, display the key result information corresponding to the viewing right and the objective information corresponding to the key result information.

In a possible implementation, the apparatus further includes: a rights update module, configured to within a first predetermined duration from obtaining the OKR display information for the first time, update the viewing right in real time based on a modification of the viewing right by the OKR system; and after the first predetermined duration from obtaining the OKR display information for the first time, delayed update the viewing right based on the modification of the viewing right by the OKR system.

In a possible implementation, the apparatus further includes: a page jump module, configured to in response to an operation on the first display area, jump to an OKR page of an OKR system to display the OKR display information in a first manner on the OKR page.

In a possible implementation, displaying the OKR display information in the first manner on the OKR page comprises: displaying one of the objective information and at least one key result information corresponding to the objective information in the OKR page in an objective display manner, the objective display manner referring to being different from a display manner of other objective information and at least one key result corresponding to the objective information.

In a possible implementation, the apparatus further includes: an OKR link display module, configured to in accordance with a determination that an OKR creator corresponding to the OKR link does not belong to a same organizational structure as a user in the session, display the OKR link in the session.

The information display apparatus provided by the disclosed embodiments can perform the steps performed in the information display method provided by the disclosed method embodiments, and has execution steps and beneficial effects that will not be described again here.

FIG. 14 is a schematic diagram of an apparatus for information sending in accordance with embodiments of the present disclosure. This embodiment can be suitable for sending OKR information to an instant messaging client in an OKR system. The apparatus may be implemented in the form of software and/or hardware. The apparatus may be configured in an electronic device, such as terminals, including but not limited to smartphones, PDAs, tablets, wearable devices with displays, desktops, laptops, all-in-one computers, smart home devices, etc. The information sending apparatus is used in an OKR system installed in an electronic device.

As shown in FIG. 14, the apparatus for information sending provided by embodiments of the present disclosure mainly includes a link obtaining module 141 and a link sending module 142.

Among them, the link obtaining module 141 is configured to in response to an operation on an objective and key result OKR information, obtain an OKR link.

The link sending module 142 is configured to send the OKR link to an instant messaging client, so that the instant messaging client obtains OKR display information corresponding to the OKR link in response to receiving the OKR link, wherein the OKR display information comprises at least one objective information and/or key result information corresponding to the objective information; displaying the OKR display information in the first display area based on a predetermined display rule.

In one possible implementation, the link obtaining module 141 is specifically configured to in response to a copy operation on a uniform resource locator url of a periodic OKR link, obtain the periodic OKR link.

In one possible implementation, the link obtaining module 141 includes: a user display unit configured to in response to an operation of a sharing button for all OKR information in a period, display an information receiving user in a second display area; an a period OKR link obtaining unit configured to in response to an operation on the information receiving user, obtain a periodic OKR link.

In a possible implementation, the link obtaining module 141 includes: a copy button display unit configured to display a period OKR copy button in the second display area in response to a share button operation on all OKR information in the period; and a period OKR link obtaining unit configured to in response to an operation on the periodic OKR copy button, obtain the periodic OKR link.

In one possible implementation, the link obtaining module 141 is specifically configured to obtain a single OKR link in response to a copy operation on single OKR information.

In a possible implementation, the apparatus further includes: an OKR information modification module configured to in response to the operation on the single OKR modification button, modify the single OKR information.

In a possible implementation, the apparatus further comprises: a right modification module, configured to in response to the operation on the single OKR information, display a right setting button in a third display area; in response to an operation on the right setting button, display a respective right operation button corresponding to each OKR information in a fourth display area, each OKR information comprising: periodic OKR information, objective information in a single OKR information, key result information in single OKR information; and in response to an operation on the right operation button, modify a viewing right of the OKR information corresponding to the right operation button.

In a possible implementation, the apparatus further comprises: an OKR information deletion module configured to in response to an operation on single OKR information, displaying an OKR delete button in a third display area; and in response to operating on the OKR delete button, delete the single OKR information.

The information sending apparatus provided by the disclosed embodiments can perform the steps performed in the information sending method provided by the disclosed method embodiments, and has execution steps and beneficial effects that will not be described again here.

FIG. 15 is a schematic structural diagram of an electronic device in embodiments of the present disclosure. Referring specifically to FIG. 15 below, a schematic structural diagram of an electronic device 1500 suitable for implementing embodiments of the present disclosure is shown. The electronic device 1500 in embodiments of the present disclosure may include, but is not limited to, a mobile phone, a laptop computer, a digital broadcast receiver, a PDA (personal digital assistant), a PAD (tablet computer), a PMP (portable multimedia player), an on-board terminal (e.g., on-board navigation terminal) and the like, as well as a fixed terminal such as a digital TV, a desktop computer and the like. The electronic device shown in FIG. 15 is merely an example and should not be construed to impose any limitations on the functionality and use scope of the embodiments of the present disclosure.

As shown in FIG. 15, the electronic device 1500 may include the electronic device may comprise processing device (e.g., a central processor, a graphics processor) 1501 which is capable of performing various appropriate actions and processes in accordance with programs stored in a read only memory (ROM) 1502 or programs loaded from storage device 1508 to a random access memory (RAM) 1503. In the RAM 1503, there are also stored various programs and data required by the electronic device 1500 when operating. The processing device 1501, the ROM 1502 and the RAM 1503 are connected to one another via a bus 1504. An input/output (I/O) interface 1505 is also connected to the bus 1504.

Generally, the following devices may be connected to the I/O interface 1505: an input device 1506 including a touch screen, a touch pad, a keyboard, a mouse, a camera, a microphone, an accelerometers, a gyroscope, or the like; an output device 1507, such as a liquid-crystal display (LCD), a loudspeaker, a vibrator, or the like; a storage device 1508, such as a magnetic tape, a hard disk or the like; and a communication device 1509. The communication device 1509 allows the electronic device 1500 to perform wireless or wired communication with other device so as to exchange data with other device. While FIG. 15 shows the electronic device 1500 with various device, it should be understood that it is not required to implement or have all of the illustrated device. Alternatively, more or less device may be implemented or exist.

Specifically, according to the embodiments of the present disclosure, the procedures described with reference to the flowchart may be implemented as computer software programs. For example, the embodiments of the present disclosure comprise a computer program product that comprises a computer program embodied on a non-transitory computer-readable medium, the computer program including program codes for executing the method shown in the flowchart. In such an embodiment, the computer program may be loaded and installed from a network via the communication device 1509, or installed from the storage device 1508, or installed from the ROM 1502. The computer program, when executed by the processing device 1501, perform the above functions defined in the method of the embodiments of the present disclosure.

It is noteworthy that the computer readable medium of the present disclosure can be a computer readable signal medium, a computer readable storage medium or any combination thereof. The computer readable storage medium may be, for example, but is not limited to, an electronic, magnetic, optical, electromagnetic, infrared or semiconductor system, apparatus or device, or any combination of the foregoing. More specific examples of the computer readable storage medium may include, without limitation to, the following: an electrical connection with one or more conductors, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the present disclosure, the computer readable storage medium may be any tangible medium including or storing a program that may be used by or in conjunction with an instruction executing system, apparatus or device. In the present disclosure, the computer readable signal medium may include data signals propagated in the baseband or as part of the carrier waveform, in which computer readable program code is carried. Such propagated data signals may take a variety of forms, including without limitation to electromagnetic signals, optical signals, or any suitable combination of the foregoing. The computer readable signal medium may also be any computer readable medium other than a computer readable storage medium that may send, propagate, or transmit a program for use by, or in conjunction with, an instruction executing system, apparatus, or device. The program code contained on the computer readable medium may be transmitted by any suitable medium, including, but not limited to, a wire, a fiber optic cable, RF (radio frequency), etc., or any suitable combination thereof.

In some implementations, the client and server may communicate utilizing any currently known or future developed network protocol such as HTTP (HyperText Transfer Protocol) and may be interconnected with digital data communications (e.g., communication networks) of any form or medium. Examples of communication networks include local area networks ("LANs"), wide area networks ("WANs"), inter-networks (e.g., the Internet), and end-to-end networks (e.g., ad hoc end-to-end networks), as well as any currently known or future developed networks.

The above computer readable medium may be contained in the above electronic device; or it may exist separately and not be assembled into the electronic device.

The computer-readable medium carries one or more programs. When the one or more programs are executed by the electronic device, cause the electronic device to: in response to receiving a sent OKR link in a session, obtain OKR display information corresponding to the OKR link, wherein the OKR display information comprises at least one objective information and/or key result information corresponding to the objective information; and display the OKR display information in a first display area of the session based on a predetermined display rule.

Alternatively, the computer-readable medium carries one or more programs. When the one or more programs are executed by the electronic device, cause the electronic device to: in response to an operation on an objective and key result OKR information, obtain an OKR link; send the OKR link to an instant messaging client, so that the instant messaging client obtains OKR display information corresponding to the OKR link in response to receiving the OKR link, wherein the OKR display information comprises at least one objective information and/or key result information corresponding to the objective information; display the OKR display information in the first display area based on a predetermined display rule.

Optionally, when one or more of the above programs are executed by the electronic device, the electronic device can also perform other steps described in the above embodiments.

Computer program code for carrying out operations of the present disclosure may be written in one or more program designing languages or a combination thereof, which include without limitation to an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Units involved in the embodiments of the present disclosure as described may be implemented in software or hardware. The name of a unit does not form any limitation on the module itself.

The functionality described above may at least partly be performed, at least in part, by one or more hardware logic components. For example, and in a non-limiting sense, example types of hardware logic components that can be used may include: field-programmable gate arrays (FPGA), application specific integrated circuits (ASICs), application specific standard products (ASSPs), systems on chips (SOCs), complex programmable logic devices (CPLDs), etc.

In the context of the present disclosure, the machine readable medium may be a tangible medium that can retain and store programs for use by or in conjunction with an instruction execution system, apparatus or device. The machine readable medium of the present disclosure can be a machine readable signal medium or a machine readable storage medium. The machine readable medium may include, but is not limited to, an electronic, magnetic, optical, electromagnetic, infrared or semiconductor system, apparatus or device, or any combination of the foregoing. More specific examples of the machine readable storage medium may include, without limitation to, the following: an electrical connection based on one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing.

According to one or more embodiments of the present disclosure, the present disclosure provides a method for information display, the method is applied to the instant messaging client, the method comprises: in response to receiving a sent OKR link in a session, obtaining OKR display information corresponding to the OKR link, wherein the OKR display information comprises at least one objective information and/or key result information corresponding to the objective information; and displaying the OKR display information in a first display area of the session based on a predetermined display rule.

According to one or more embodiments of the present disclosure, the present disclosure provides a method for information display, wherein displaying the OKR display information in a first display area of the session based on a predetermined display rule comprises: displaying card information in the first display area of the session, the card information comprising: OKR summary information and/or OKR display information, the OKR summary information comprising: an OKR period and an OKR creator.

According to one or more embodiments of the present disclosure, the present disclosure provides a method for information display, wherein if the OKR link is a periodic OKR link, the OKR display information comprises at least one objective information within the period; displaying the OKR display information in the first display area based on the predetermined display rule comprises: displaying at least one objective information within the period in the first display area, the objective information comprising at least one of: an objective serial number, an objective content, and a user link related to the objective content.

According to one or more embodiments of the present disclosure, the present disclosure provides a method for information display, wherein if the OKR link is a single OKR link, the OKR display information comprises one objective information and/or at least one key result information corresponding to the objective information; displaying the OKR display information in the first display area based on the predetermined display rule comprises: displaying the objective information and/or the at least one key result information corresponding to the objective information in the first display area, the objective information comprising at least one of: an objective serial number, an objective content, and a user link related to the objective content, the key result information comprising at least one of: a key result serial number, a key result content, and a user link related to the key result content.

According to one or more embodiments of the present disclosure, the present disclosure provides a method for information display, the method further comprises: determining whether a user corresponding to the session has the right to view the OKR display information based on the OKR link; in accordance with a determination that the user corresponding to the session does not have the right to view the OKR display information, displaying first prompt information to prompt the user that he does not have the right to view the OKR display information.

According to one or more embodiments of the present disclosure, the present disclosure provides a method for information display, wherein if the OKR display information comprises a plurality of objective information within the period, the method further comprises: in accordance with a determination that the user corresponding to the session has a viewing right for any one of the objective information of in the period, displaying the objective information corresponding to the viewing right.

According to one or more embodiments of the present disclosure, the present disclosure provides a method for information display, wherein if the OKR display information comprises one objective information and at least one key result information corresponding to the objective information, the method further comprises: in accordance with a determination that the user corresponding to the session has the right to view the objective information, displaying the objective information and the key result information corresponding to the objective information; and/or in accordance with a determination that the user corresponding to the session has a viewing right for any of the key result information, displaying the key result information corresponding to the viewing right and the objective information corresponding to the key result information.

According to one or more embodiments of the present disclosure, the present disclosure provides a method for information display, wherein within a first predetermined duration from obtaining the OKR display information for the first time, the viewing right is updated in real time based on a modification of the viewing right by the OKR system; after the first predetermined duration from obtaining the OKR display information for the first time, the viewing right is delayed updated based on the modification of the viewing right by the OKR system.

According to one or more embodiments of the present disclosure, the present disclosure provides a method for information display, further comprising: in response to an operation on the first display area, jumping to an OKR page of an OKR system to display the OKR display information in a first manner on the OKR page.

According to one or more embodiments of the present disclosure, the present disclosure provides a method for information display, wherein displaying the OKR display information in the first manner on the OKR page comprises: displaying one of the objective information and at least one key result information corresponding to the objective information in the OKR page in an objective display manner, the objective display manner referring to being different from a display manner of other objective information and at least one key result corresponding to the objective information.

According to one or more embodiments of the present disclosure, the present disclosure provides a method for information display, further comprising: in accordance with a determination that an OKR creator corresponding to the OKR link does not belong to a same organizational structure as a user in the session, displaying the OKR link in the session.

According to one or more embodiments of the present disclosure, the present disclosure provides a method for information sending, the method is applied to the OKR system, and the method comprises: in response to an operation on an objective and key result OKR information, obtaining an OKR link; sending the OKR link to an instant messaging client, so that the instant messaging client obtains OKR display information corresponding to the OKR link in response to receiving the OKR link, wherein the OKR display information comprises at least one objective information and/or key result information corresponding to the objective information; displaying the OKR display information in the first display area based on a predetermined display rule.

According to one or more embodiments of the present disclosure, the present disclosure provides a method for information sending, wherein in response to operating on the OKR information, obtaining OKR links comprises: in response to a copy operation on a uniform resource locator url of a periodic OKR link, obtaining the periodic OKR link.

According to one or more embodiments of the present disclosure, the present disclosure provides a method for information sending, wherein in response to operating on the OKR information, obtaining an OKR link comprises: in response to an operation of a sharing button for all OKR information in a period, displaying an information receiving user in a second display area; in response to an operation on the information receiving user, obtaining a periodic OKR link.

According to one or more embodiments of the present disclosure, the present disclosure provides a method for information sending, wherein in response to operating on the OKR information, obtaining an OKR link comprises: in response to an operation of a sharing button for all OKR information in a period, displaying a periodic OKR copy button in a second display area; in response to an operation on the periodic OKR copy button, obtaining the periodic OKR link.

According to one or more embodiments of the present disclosure, the present disclosure provides a method for information sending, wherein in response to operating on the OKR information, obtaining an OKR link comprises: obtaining a single OKR link in response to a copy operation on single OKR information.

According to one or more embodiments of the present disclosure, the present disclosure provides a method for information sending, further comprising: in response to the operation on the single OKR modification button, modifying the single OKR information.

According to one or more embodiments of the present disclosure, the present disclosure provides a method for information sending, further comprising: in response to the operation on the single OKR information, displaying a right setting button in a third display area; in response to an operation on the right setting button, displaying a respective right operation button corresponding to each OKR information in a fourth display area, each OKR information comprising: periodic OKR information, objective information in a single OKR information, key result information in single OKR information; in response to an operation on the right operation button, modifying a viewing right of the OKR information corresponding to the right operation button.

According to one or more embodiments of the present disclosure, the present disclosure provides a method for information sending, further comprising: in response to an operation on single OKR information, displaying an OKR delete button in a third display area; in response to operating on the OKR delete button, deleting the single OKR information.

According to one or more embodiments of the present disclosure, the present disclosure provides an apparatus for information display, wherein the apparatus is configured for an instant messaging client, and the apparatus comprises: an information obtaining module configured to in response to receiving a sent OKR link in a session, obtain OKR display information corresponding to the OKR link, wherein the OKR display information comprises at least one objective information and/or key result information corresponding to the objective information; and an information display module configured to display the OKR display information in a first display area of the session based on a predetermined display rule.

According to one or more embodiments of the present disclosure, the present disclosure provides an apparatus for information display, wherein the apparatus further includes: an information display module further configured to display card information in the first display area of the session, the card information comprising: OKR summary information and/or OKR display information, the OKR summary information comprising: an OKR period and an OKR creator.

According to one or more embodiments of the present disclosure, the present disclosure provides an apparatus for information display, wherein if the OKR link is a periodic OKR link, the OKR display information comprises at least one objective information within the period; the information display module is specifically used to display at least one objective information within the period in the first display area, the objective information comprising at least one of: an objective serial number, an objective content, and a user link related to the objective content.

According to one or more embodiments of the present disclosure, the present disclosure provides an apparatus for information display, wherein if the OKR link is a single OKR link, the OKR display information comprises one objective information and/or at least one key result information corresponding to the objective information; the information display module is specifically used to display the objective information and/or the at least one key result information corresponding to the objective information in the first display area, the objective information comprising at least one of: an objective serial number, an objective content, and a user link related to the objective content, the key result information comprising at least one of: a key result serial number, a key result content, and a user link related to the key result content.

According to one or more embodiments of the present disclosure, the present disclosure provides an apparatus for information display, wherein the apparatus further includes: a viewing right determination module, configured to determine whether a user corresponding to the session has the right to view the OKR display information based on the OKR link; a first prompt information display module, configured to in accordance with a determination that the user corresponding to the session does not have the right to view the OKR display information, display first prompt information to prompt the user that he does not have the right to view the OKR display information.

According to one or more embodiments of the present disclosure, the present disclosure provides an apparatus for information display, wherein if the OKR display information comprises a plurality of objective information within the period, the information display module 132 is specifically used to in accordance with a determination that the user corresponding to the session has a viewing right for any one of the objective information of in the period, display the objective information corresponding to the viewing right.

According to one or more embodiments of the present disclosure, the present disclosure provides an apparatus for information display, wherein if the OKR display information comprises one objective information and at least one key result information corresponding to the objective information, the information display module is specifically configured to in accordance with a determination that the user corresponding to the session has the right to view the objective information, display the objective information and the key result information corresponding to the objective information; and/or in accordance with a determination that the user corresponding to the session has a viewing right for any of the key result information, display the key result information corresponding to the viewing right and the objective information corresponding to the key result information.

According to one or more embodiments of the present disclosure, the present disclosure provides an apparatus for information display, wherein the apparatus further includes: a rights update module, configured to within a first predetermined duration from obtaining the OKR display information for the first time, update the viewing right in real time based on a modification of the viewing right by the OKR system; and after the first predetermined duration from obtaining the OKR display information for the first time, delayed update the viewing right based on the modification of the viewing right by the OKR system.

According to one or more embodiments of the present disclosure, the present disclosure provides an apparatus for information display, wherein the apparatus further includes: a page jump module, configured to in response to an operation on the first display area, jump to an OKR page of an OKR system to display the OKR display information in a first manner on the OKR page.

According to one or more embodiments of the present disclosure, the present disclosure provides an apparatus for information display, wherein displaying the OKR display information in the first manner on the OKR page comprises: displaying one of the objective information and at least one key result information corresponding to the objective information in the OKR page in an objective display manner, the objective display manner referring to being different from a display manner of other objective information and at least one key result corresponding to the objective information.

According to one or more embodiments of the present disclosure, the present disclosure provides an apparatus for information display, wherein the apparatus further includes: an OKR link display module, configured to in accordance with a determination that an OKR creator corresponding to the OKR link does not belong to a same organizational structure as a user in the session, display the OKR link in the session.

According to one or more embodiments of the present disclosure, the present disclosure provides an apparatus for information sending, wherein the apparatus is configured for an OKR system, and the apparatus comprises: a link obtaining module configured to in response to an operation on an objective and key result OKR information, obtain an OKR link; and a link sending module configured to sending the OKR link to an instant messaging client, so that the instant messaging client obtains OKR display information corresponding to the OKR link in response to receiving the OKR link, wherein the OKR display information comprises at least one objective information and/or key result information corresponding to the objective information; display the OKR display information in the first display area based on a predetermined display rule.

According to one or more embodiments of the present disclosure, the present disclosure provides an apparatus for information sending, wherein the link obtaining module 141 is specifically configured to in response to a copy operation on a uniform resource locator url of a periodic OKR link, obtain the periodic OKR link.

According to one or more embodiments of the present disclosure, the present disclosure provides an apparatus for information sending, wherein the link obtaining module 141 includes: a user display unit configured to in response to an operation of a sharing button for all OKR information in a period, display an information receiving user in a second display area; an a period OKR link obtaining unit configured to in response to an operation on the information receiving user, obtain a periodic OKR link.

According to one or more embodiments of the present disclosure, the present disclosure provides an apparatus for information sending, wherein the link obtaining module 141 includes: a copy button display unit configured to display a period OKR copy button in the second display area in response to a share button operation on all OKR information in the period; and a period OKR link obtaining unit configured to in response to an operation on the periodic OKR copy button, obtain the periodic OKR link.

According to one or more embodiments of the present disclosure, the present disclosure provides an apparatus for information sending, wherein the link obtaining module 141 is specifically configured to obtain a single OKR link in response to a copy operation on single OKR information.

According to one or more embodiments of the present disclosure, the present disclosure provides an apparatus for information sending, wherein the apparatus further includes: an OKR information modification module configured to in response to the operation on the single OKR modification button, modify the single OKR information.

According to one or more embodiments of the present disclosure, the present disclosure provides an apparatus for information sending, wherein the apparatus further comprises: a right modification module, configured to in response to the operation on the single OKR information, display a right setting button in a third display area; in response to an operation on the right setting button, display a respective right operation button corresponding to each OKR information in a fourth display area, each OKR information comprising: periodic OKR information, objective information in a single OKR information, key result information in single OKR information; and in response to an operation on the right operation button, modify a viewing right of the OKR information corresponding to the right operation button.

According to one or more embodiments of the present disclosure, the present disclosure provides an apparatus for information sending, wherein the apparatus further comprises: an OKR information deletion module configured to in response to an operation on single OKR information, displaying an OKR delete button in a third display area; and in response to operating on the OKR delete button, delete the single OKR information.

According to one or more embodiments of the present disclosure, the present disclosure provides an electronic device comprising:

one or more processors;

a storage device for storing one or more programs;

when the one or more programs are executed by the one or more processors, causing the one or more processors to implement any of the disclosed method according to the present disclosure.

According to one or more embodiments of the present disclosure, the present disclosure provides a computer-readable storage medium with a computer program stored thereon, wherein when the program is executed by a processor, implementing the above described method.

The foregoing description is merely illustration of the preferred embodiments of the present disclosure and the technical principles used herein. Those skilled in the art should understand that the disclosure scope involved therein is not limited to the technical solutions formed from a particular combination of the above technical features, but should also cover other technical solutions formed by any combination of the above technical features or their equivalent features without departing from the above disclosure concepts, e.g., technical solutions formed by replacing the above features with technical features having similar functions disclosed (without limitation) in the present disclosure.

In addition, although various operations have been depicted in a particular order, it should not be construed as requiring that the operations be performed in the particular order shown or in sequential order of execution. Multitasking and parallel processing may be advantageous in certain environments. Likewise, although the foregoing discussion includes several specific implementation details, they should not be construed as limiting the scope of the present disclosure. Some features described in the context of separate embodiments may also be realized in combination in a single embodiment. On the contrary, various features described in the context of a single embodiment may also be realized in a plurality of embodiments, either individually or in any suitable sub-combinations.

While the present subject matter has been described using language specific to structural features and/or method logic actions, it should be understood that the subject matter defined in the appended claims is not necessarily limited to the particular features or actions described above. On the contrary, the particular features and actions described above are merely example forms of realizing the claims. With respect to the apparatus in the above embodiment, the specific manner in which each module performs an operation has been described in detail in the embodiments relating to the method, and will not be detailed herein.

We claim:

1. A method for information display, comprising:

receiving, at an instant messaging client implemented at an electronic device, an objective and key result (OKR) link in a session, the OKR link indicating an address link of OKR information in an OKR system;

parsing, at the instant messaging client, the OKR information based on the OKR link via a communication framework between the instant messaging client and the OKR system, wherein the OKR information comprises at least one of: OKR summary information or OKR display information, and the OKR display information comprises at least one objective information and/or key result information corresponding to the at least one objective information;

determining whether a user corresponding to the session has the right to view the OKR display information based on the OKR link;

displaying, on a first display page displayed on the electronic device, the OKR information comprising the OKR display information, in a first display area of the first display page based on a predetermined display rule, in accordance with the user having the right to review the OKR display information, wherein the first display page corresponds to the session of the instant messaging client, wherein if the OKR link is a periodic OKR link, the OKR display information comprises at least one objective information within a period, and wherein displaying the OKR display information in the first display area based on the predetermined display rule comprises: displaying at least one objective information within the period in the first display area, the objective information comprising at least one of: an objective serial number, an objective content, and a user link related to the objective content, and wherein if the OKR display information comprises a plurality of objective information within the period, the method further comprises: in accordance with a determination that the user corresponding to the session has a viewing right for any one of the objective information in the period, displaying the objective information corresponding to the viewing right; and jumping, in response to detecting a user operation on the first display area, from the first display page to an OKR page displayed on the electronic device to display the OKR display information in a first manner on the OKR page, the OKR page corresponding to the OKR system, wherein within a first predetermined duration from obtaining the OKR display information for the first time, the viewing right is updated in real time based on a modification of the viewing right by the OKR system, or wherein after the first predetermined duration from obtaining the OKR display information for the first time, the viewing right is delayed updated based on the modification of the viewing right by the OKR system.

2. The method of claim 1, wherein displaying the OKR information in a first display area based on a predetermined display rule comprises:

displaying card information in the first display area, the card information comprising: the OKR summary information and/or the OKR display information, the OKR summary information comprising: an OKR period and an OKR creator.

3. The method of claim 1, wherein if the OKR link is a single OKR link, the OKR display information comprises one objective information and/or at least one key result information corresponding to the objective information, wherein displaying the OKR display information in the first display area based on the predetermined display rule comprises:

displaying the objective information and/or the at least one key result information corresponding to the objective information in the first display area, the objective information comprising at least one of: an objective serial number, an objective content, and a user link related to the objective content, the key result information comprising at least one of: a key result serial number, a key result content, and a user link related to the key result content.

4. The method of claim 3, wherein if the OKR display information comprises one objective information and at least one key result information corresponding to the objective information, the method further comprises:

in accordance with a determination that the user corresponding to the session has the right to view the objective information, displaying the objective information and the key result information corresponding to the objective information; and/or in accordance with a determination that the user corresponding to the session has a viewing right for any of the key result information, displaying the key result information corresponding to the viewing right and the objective information corresponding to the key result information.

5. The method of claim 1, further comprising:

in accordance with a determination that the user corresponding to the session does not have the right to view the OKR display information, displaying first prompt information to prompt the user that he does not have the right to view the OKR display information.

6. The method of claim 1, wherein displaying the OKR display information in the first manner on the OKR page comprises:

displaying one of the objective information and at least one key result information corresponding to the objective information in the OKR page in an objective display manner, the objective display manner being different from a display manner of other objective information and at least one key result corresponding to the objective information.

7. The method of claim 1, further comprising:

in accordance with a determination that an OKR creator corresponding to the OKR link does not belong to a same organizational structure as a user in the session, displaying the OKR link in the session.

8. An electronic device comprising
  one or more processors;
  a storage device for storing one or more programs;
  when the one or more programs are executed by the one or more processors, causing the one or more processors to implement a method comprising:
    receiving, at an instant messaging client implemented at the electronic device, an objective and key result (OKR) link in a session, the OKR link indicating an address link of OKR information in an OKR system;
    parsing, at the instant messaging client, the OKR information based on the OKR link via a communication framework between the instant messaging client and the OKR system, wherein the OKR information comprises OKR summary information and/or OKR display information, and the OKR display information comprises at least one objective information and/or key result information corresponding to the at least one objective information;

determining whether a user corresponding to the session has the right to view the OKR display information based on the OKR link;

displaying, on a first display page displayed on the electronic device, the OKR information comprising the OKR display information, in a first display area of the first display page based on a predetermined display rule, in accordance with the user having the right to review the OKR display information, wherein the first display page corresponds to the session of the instant messaging client, wherein if the OKR link is a periodic OKR link, the OKR display information comprises at least one objective information within a period, and wherein displaying the OKR display information in the first display area based on the predetermined display rule comprises: displaying at least one objective information within the period in the first display area, the objective information comprising at least one of: an objective serial number, an objective content, and a user link related to the objective content, and wherein if the OKR display information comprises a plurality of objective information within the period, the method further comprises: in accordance with a determination that the user corresponding to the session has a viewing right for any one of the objective information in the period, displaying the objective information corresponding to the viewing right; and jumping, in response to detecting a user operation on the first display area, from the first display page to an OKR page displayed on the electronic device to display the OKR display information in a first manner on the OKR page, the OKR page corresponding to the OKR system, wherein within a first predetermined duration from obtaining the OKR display information for the first time, the viewing right is updated in real time based on a modification of the viewing right by the OKR system, or wherein after the first predetermined duration from obtaining the OKR display information for the first time, the viewing right is delayed updated based on the modification of the viewing right by the OKR system.

9. The electronic device of claim 8, wherein displaying the OKR information in a first display area based on a predetermined display rule comprises:

displaying card information in the first display area, the card information comprising: the OKR summary information and/or the OKR display information, the OKR summary information comprising: an OKR period and an OKR creator.

10. The electronic device of claim 8, wherein if the OKR link is a single OKR link, the OKR display information comprises one objective information and/or at least one key result information corresponding to the objective information;

displaying the OKR display information in the first display area based on the predetermined display rule comprises:

displaying the objective information and/or the at least one key result information corresponding to the objective information in the first display area, the objective information comprising at least one of: an objective serial number, an objective content, and a user link related to the objective content, the key result information comprising at least one of: a key result serial number, a key result content, and a user link related to the key result content.

11. The electronic device of claim 8, further comprising:

in accordance with a determination that the user corresponding to the session does not have the right to view the OKR display information, displaying first prompt information to prompt the user that he does not have the right to view the OKR display information.

12. The electronic device of claim 8, wherein displaying the OKR display information in the first manner on the OKR page comprises:

displaying one of the objective information and at least one key result information corresponding to the objective information in the OKR page in an objective display manner, the objective display manner being different from a display manner of other objective information and at least one key result corresponding to the objective information.

13. The electronic device of claim 8, further comprising:

in accordance with a determination that an OKR creator corresponding to the OKR link does not belong to a same organizational structure as a user in the session, displaying the OKR link in the session.

14. A non-transitory computer-readable storage medium with a computer program stored thereon, the computer program when executed by a processor, cause the processor to implement a method comprising:

causing an instant messaging client to receive an objective and key result (OKR) link in a session, the OKR link indicating an address link of OKR information in an OKR system;

causing the instant messaging client to parse the OKR information based on the OKR link via a communication framework between the instant messaging client and the OKR system, wherein the OKR information comprises OKR summary information and/or OKR display information, and the OKR display information comprises at least one objective information and/or key result information corresponding to the at least one objective information;

causing to determine whether a user corresponding to the session has the right to view the OKR display information based on the OKR link;

causing to display, on a first display page, the OKR information comprising the OKR display information, in a first display area within the first display page based on a predetermined display rule, in accordance with the user having the right to review the OKR display information, wherein the first display page corresponds to the session of the instant messaging client, wherein if the OKR link is a periodic OKR link, the OKR display information comprises at least one objective information within a period, and wherein displaying the OKR display information in the first display area based on the predetermined display rule comprises: displaying at least one objective information within the period in the first display area, the objective information comprising at least one of: an objective serial number, an objective content, and a user link related to the objective content, and wherein if the OKR display information comprises a plurality of objective information within the period, the method further comprises: in accordance with a determination that the user corresponding to the session has a viewing right for any one of the objective information in the period, displaying the objective information corresponding to the viewing right; and causing to jump, in response to detecting a user operation on the first display area, from the first display page to an OKR page to display the OKR display information in a first manner on the OKR page, the OKR page corresponding to the OKR system, wherein within a first predetermined duration from obtaining the OKR display information for the first time, the viewing right is updated in real time based on a modification of the viewing right by the OKR system, or wherein after the first predetermined duration from obtaining the OKR display information for the first time, the viewing right is delayed updated based on the modification of the viewing right by the OKR system.

* * * * *